United States Patent [19]

Bernier et al.

[11] Patent Number: 4,807,453
[45] Date of Patent: Feb. 28, 1989

[54] BICYCLE ANTI-THEFT DEVICE

[75] Inventors: Denis Bernier; Jean-Francois Simard, both of Montreal, Canada

[73] Assignee: Cyclopark Inc., Montreal, Canada

[21] Appl. No.: 60,359

[22] Filed: Jun. 10, 1987

[51] Int. Cl.⁴ ............................................. E05B 71/00
[52] U.S. Cl. ..................................... 70/233; 70/226; 70/234; 70/14; 70/57; 211/5
[58] Field of Search ................................ 70/233–236, 70/226, 227, 14, 15, 18, 57, 58, 62; 211/4, 5, 7, 8, 17–22; 194/40, 49, 64

[56] References Cited

U.S. PATENT DOCUMENTS

| 3,568,479 | 3/1971 | Fleck et al. | 211/4 X |
| 3,611,760 | 10/1971 | Muther | 70/18 |
| 3,762,569 | 10/1973 | Spring | 211/5 |
| 3,783,659 | 1/1974 | Rossi | 70/234 |
| 3,802,232 | 4/1974 | Mattson et al. | 70/234 |
| 3,815,721 | 6/1974 | Montoya et al. | 194/40 |
| 3,827,773 | 8/1974 | Aiello | 211/5 X |
| 3,865,245 | 2/1975 | Lieb et al. | 211/5 |
| 3,879,027 | 4/1975 | Thurmond, Jr. | 211/22 X |
| 3,934,436 | 1/1976 | Candlin et al. | 211/5 X |
| 3,942,646 | 3/1976 | Nelson et al. | 211/5 |
| 3,944,079 | 3/1976 | Boslough | 211/5 |
| 3,969,914 | 7/1976 | Dennen | 70/234 |
| 3,970,197 | 7/1976 | Bale, Jr. | 211/5 |
| 3,989,327 | 11/1976 | Candelaria | 211/5 X |
| 3,996,775 | 12/1976 | Waldron | 70/234 |
| 4,033,160 | 7/1977 | Mima | 70/227 X |
| 4,066,195 | 1/1978 | Dickler | 70/15 X |
| 4,069,919 | 1/1978 | Fernbaugh | 70/62 X |
| 4,112,720 | 9/1978 | Green | 70/233 |
| 4,126,228 | 11/1978 | Bala et al. | 211/5 |
| 4,725,075 | 2/1988 | Biancardi | 70/235 X |

FOREIGN PATENT DOCUMENTS

| 0034554 | 8/1981 | European Pat. Off. | 70/234 |
| 2556352 | 6/1977 | Fed. Rep. of Germany | 70/18 |
| 2566649 | 1/1986 | France | 211/4 |
| 337265 | 2/1936 | Italy | 70/234 |
| 01646 | 5/1983 | World Int. Prop. O. | 70/233 |

Primary Examiner—Robert L. Wolfe
Assistant Examiner—Suzanne L. Dino
Attorney, Agent, or Firm—Robic, Robic & Associates

[57] ABSTRACT

A locking fixture for use in locking up two wheeled vehicles such as bicycles or motorcycles. The fixture has a housing and at least one elongated, flexible locking member. One end of the locking member is fixedly mounted within the housing. The other end of the locking member is adapted to be inserted into the housing through an opening, and held therein to form a closed loop to hold the vehicle to the housing. A latch is provided within the housing to hold the other end of the locking member. A lock accessible from outside of the housing, is provided to block the latch in holding position to prevent withdrawal of the locking member and unauthorized retrieval of the vehicle.

14 Claims, 21 Drawing Sheets

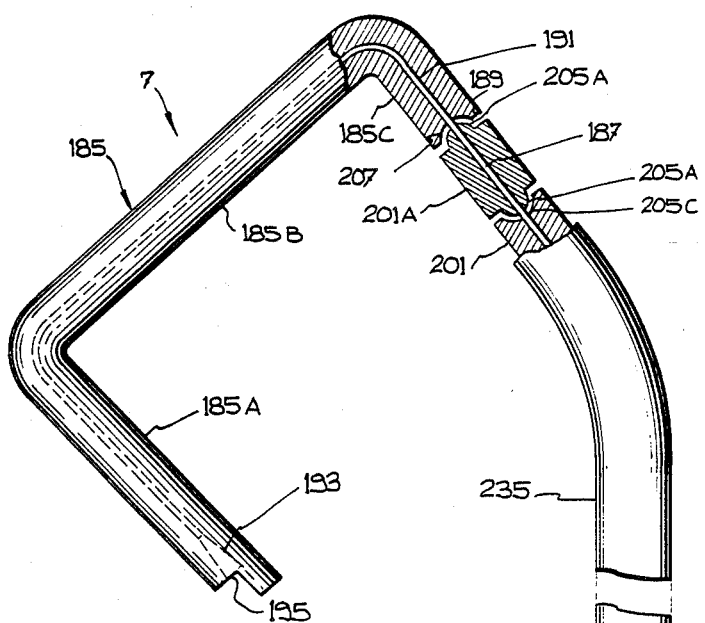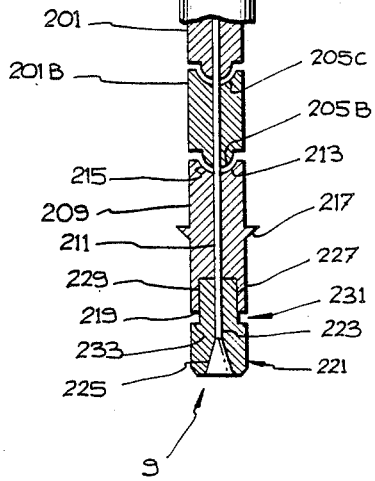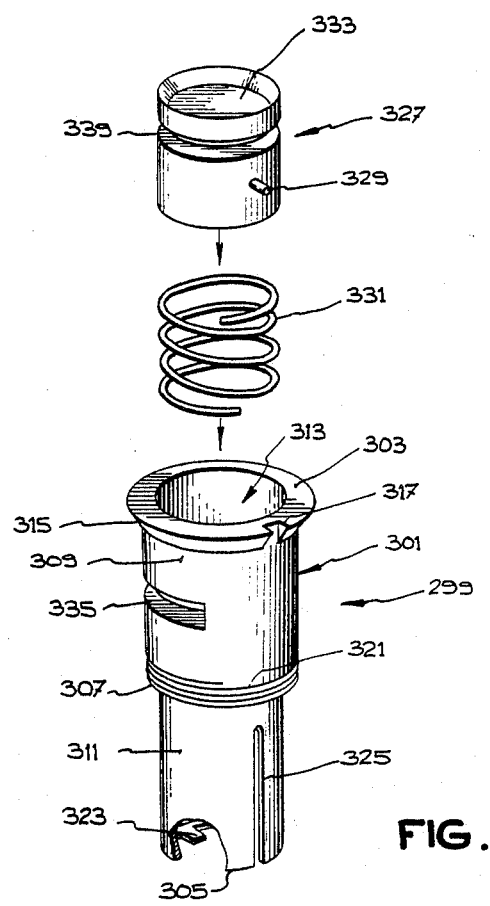

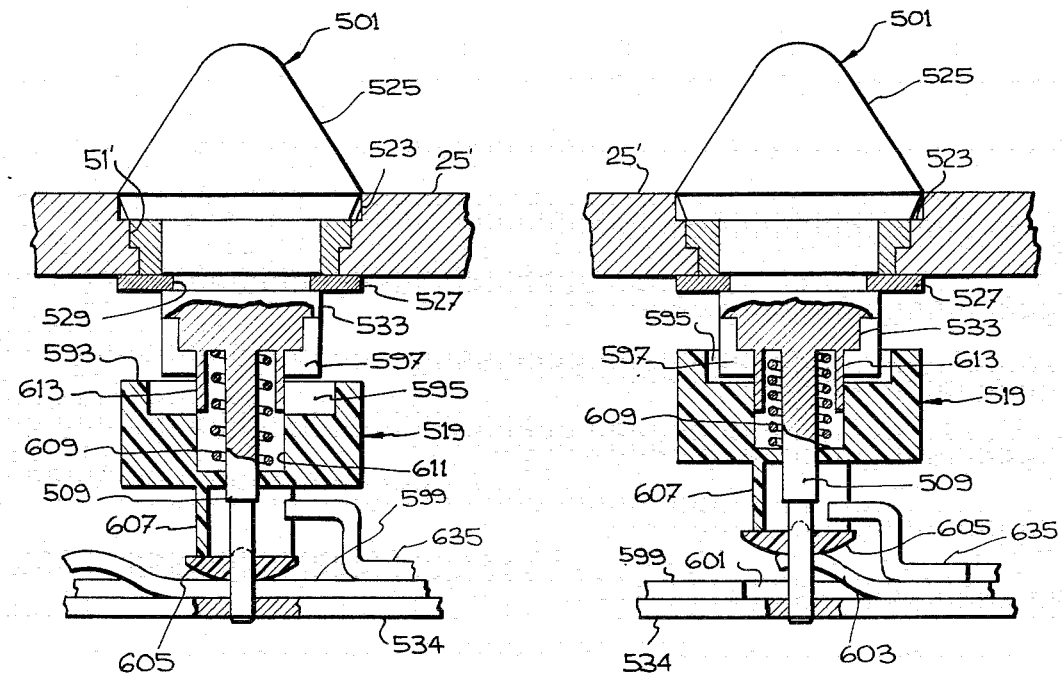
Fig. 36  Fig. 37
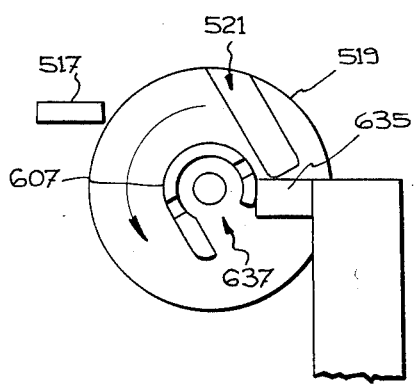  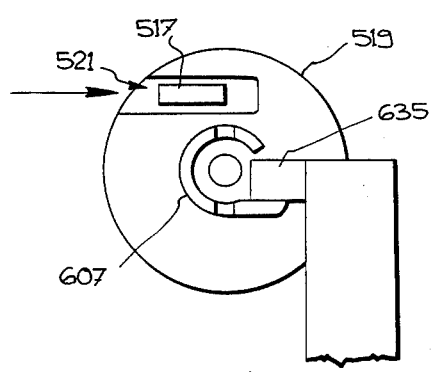
Fig. 38  Fig. 39

4,807,453

BICYCLE ANTI-THEFT DEVICE

BACKGROUND OF THE INVENTION (a) Field of the invention

The present invention relates to a locking fixture.

The invention more particularly relates to a locking fixture adapted to be mounted on a fixed stand and used for locking two wheeled vehicles, such as bicycles, mopeds or motorcycles, to the stand to prevent their theft, which locking fixture is of the type employing at least one flexible, elongated locking member that can be looped about a portion of the vehicle and locked to the fixture.

(b) Brief description of the prior art

Anti-theft fixtures or stands for locking vehicles such as bicycles to a stand to prevent their theft are well known. Examples of such fixtures are shown in the following U.S. Pat. Nos. 3,783,659; 3,815,721; 3,865,245; 3,944,079; 3,996,775 and 4,126,228.

Many of these known fixtures have the disadvantage of being difficult to operate. For some of them, the vehicle must be positioned in a specific position before it can be locked up. Other fixtures require the use of a key to lock up the vehicle, which key can be easily lost.

Another major disadvantage of most of the anti-theft stands is that they can be easily vandalized, making them inoperable. Some of the known stands can even be easily disassembled at the site with ordinary tools permitting theft of the locked-up vehicle along with part or all of the locking fixture on the stand.

OBJECTS OF THE INVENTION

It is an object of the present invention to provide a locking fixture of the above mentioned type, which is easy to operate, maintain and manage.

It is another object of the present invention to provide a locking fixture especially designed for anti-theft parking of bicycles, moped and motorcycles, which fixture is a permanent part of the environment and thus frees the cyclist or motorcyclist from the burden of cables, locks and chains.

It is a further object of the invention to provide a locking fixture which is designed to suit a variety of users and locations such as schools, parks, shopping areas, work places and homes and which can be offered in such locations as a free facility by public, or for rent by a private enterprise.

It is still another object of the present invention to provide a locking fixture that is extremely sturdy in construction and difficult to vandalize.

It is a further object of the present invention to provide a locking fixture that makes it more difficult to steal a vehicle locked up by the fixture.

SUMMARY OF THE INVENTION

In accordance with the present invention, these objects are achieved with a locking fixture having a housing made in two parts from strong, cast material. The housing is constructed to be assembled and mounted on a fixed stand with normally concealed and inaccessible fastening means. The fixture has at least one elongated, flexible locking member outside of the housing. One end of the locking member is securely fixed within the housing. The other end of the locking member is adapted to be inserted into the housing through a normally closed opening in the housing. Latch means are provided within the housing for holding the other end of the locking member within the housing when it is inserted into the housing through the opening. Latch operating means, accessible from outside of the housing, are provided for moving the latch means between holding and non-holding positions. Lock means, also accessible from outside of the housing, are provided for locking the latch means in the holding position. The lock means may consist of a key lock or of a coin-operated, combination lock. Preferably however, the lock means are of the combination type to avoid use of a key.

The flexible, elongated locking member is of a type that makes it extremely difficult to sever. The parts of the latch operating means and the lock means, accessible from outside of the housing, are constructed in a manner to minimize damage from vandals. The operating parts of the fixture outside of the housing cannot be easily broken or damaged, and the operating parts within the housing are well protected.

When use is made of a combination lock, the combination can be easily changed when another person is to take over use of the fixture. Stands incorporating the locking fixtures can be used at public buildings, schools and/or work places. The locking fixtures can be rented out to regular users.

The invention is particularly directed toward a locking fixture having a housing and means for mounting the housing at a fixed location. The fixture has at least one elongated, flexible, locking member outside of the housing with means for fastening one end of the locking member within the housing. An opening is provided in the housing to selectively receive the other end of the locking member. Latch means are provided within the housing for holding the other end of the locking member within the housing when it is inserted into the housing through the opening. The fixture has lock means, operable from outside the housing, for locking the latch means in a holding position to prevent withdrawal of the other end of the locking member from the housing. The fixture also has operator means in the housing, operable from outside of the housing, for manually moving the latch means between holding and non-holding positions when the latch means is unlocked.

Advantageously, the operator means are mechanically connected to the latch means through resilient means giving a slack to the connection. This slack prevents the operator means from being used to tamper with the latch means.

BRIEF DESCRIPTION OF THE DRAWINGS

Several embodiments of the invention will now be described in detail having reference to the accompanying drawings in which:

FIG. 10 is a plan view of one locking member partly in section;

FIG. 14 is a perspective, exploded view of a socket and closure plug;

FIGS. 36 and 37 are cross-sectional top plan views of a combination knob assembly and the adjacent portion of the lock mechanism in locking and unlocking positions respectively;

FIGS. 38 and 39 are cross-sectional rear elevational views of a combination knob assembly and lock mechanism in different positions during unlocking of the fixture;

DESCRIPTION OF PREFERRED EMBODIMENTS

Figure 2:
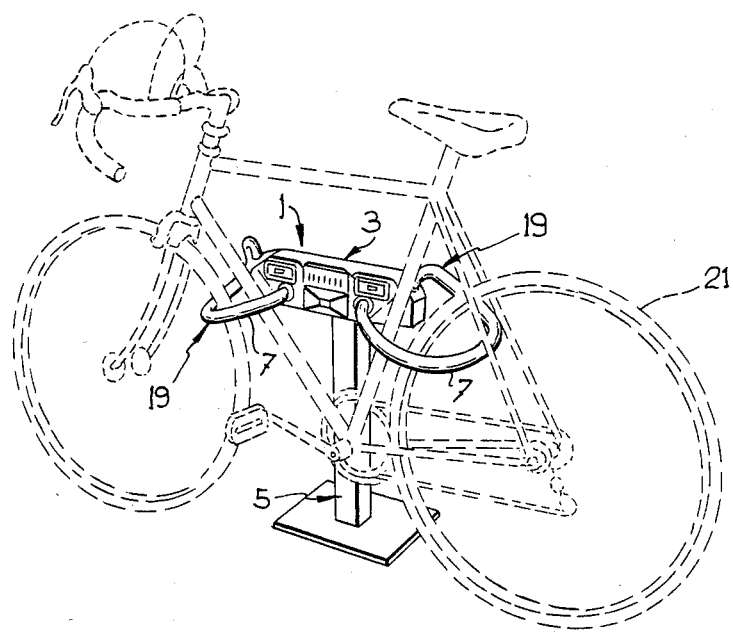
FIG. 2 is another perspective view of the locking fixture shown in FIG. 1, in use for locking a bicycle.
Figure 1:
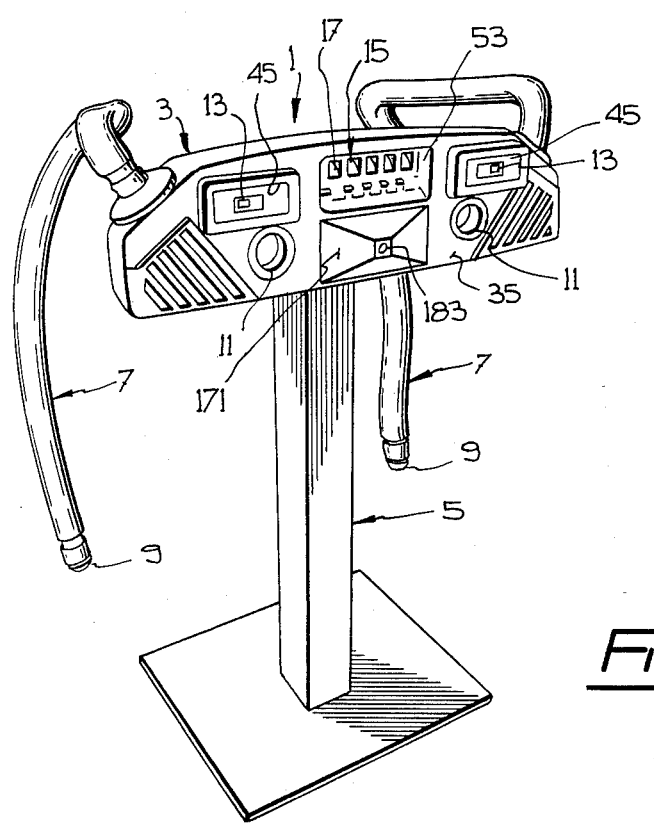
FIG. 1 is a perspective view of a locking fixture according to a first embodiment of the invention, mounted on a fixed stand.
Figure 3:
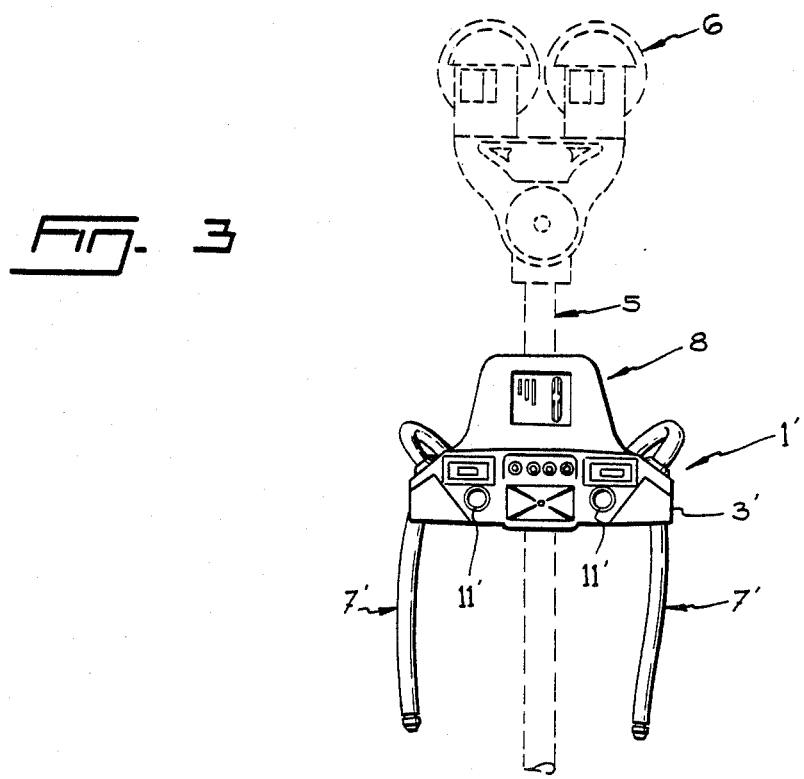
FIG. 3 is a front elevational view of a locking fixture according to a second embodiment of the invention, mounted on a parking meter.

The locking fixture 1 according to a first embodiment of the present invention, as generally shown in FIGS. 1 and 2, has a housing 3 adapted to be mounted on a fixed support such as a stand 5. The stand 5 which must of course be fixedly mounted to the ground by any suitable fastening means such as a bolted plate or a concrete base, may be specially provided for this purpose. Alternatively, it may form part of an already existing structure fixed to the ground, such as, for example, the supporting pole of a parking meter 6 as shown in FIG. 3.

Mounted at each end of the housing 3 is an elongated, flexible locking member 7. Each locking member 7 is fixed at one end to the housing 3. The other free end 9 of each locking member 7 is adapted to be selectively locked to the housing 3. Openings 11 are provided in the housing 3 through which the free ends 9 of the locking members 7 can be inserted into the housing to be locked therein. Latch means within the housing 3 are operated by latch operators 13 located on the front of the housing 3 to receive and hold the free ends 9 of the locking members 7. Once the free ends 9 of the locking members 7 are held in place, lock means 15, accessible on the front of the housing 3, are operated to prevent the latch operators 13 from releasing the locking members 7.

The lock means 15 is of the combination type and includes a set of numbered, rotatable dials 17 which must be in a certain rotational alignment to release the latch means. Once the dials 17 are in a certain rotational alignment, the latch operators 13 can be used to move the released latch means in order to free the free ends 9 of the locking members 7 and thus allow the locking members 9 to be withdrawn from the housing 3 through the openings 11. The locking members 7, when their free ends 9 are locked in the housing, form closed loops 19, as shown in FIG. 2, which can be used to hold the frame and both wheels of a two wheeled vehicle, such as a bicycle 21, to the stand 5.

Figure 4:
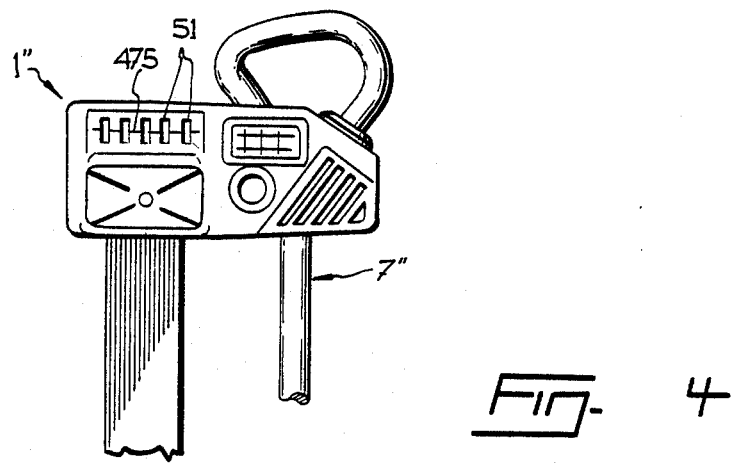
FIG. 4 is a front elevational view of a locking fixture according to a third embodiment of the invention, having only one locking member.

It is worth mentioning that in some particular applications where the frame and one wheel only of the vehicle have to be locked, use can be made of looking fixtures 1" like the one shown in FIG. 4, comprising a single locking member 7".

The housing 3 of the locking fixture 1 is, as shown in FIG. 4, made in two parts, a front housing 25 and a rear housing 27, which are connected together with normally inaccessible bolts 29. The housing 3 is also provided with means for fastening it to the vertical stand 5 with a normally inaccessible mounting bolt 31. The housing parts 25, 27 are made from suitable sturdy material, such as cast ductile steel 275" thickness for example.

The front housing 25, as shown in FIGS. 1, 5, 6, 11 and 19 has a front wall 35 and an encircling side wall 37. A central, top portion 37A of the side wall 37 extends rearwardly of the front wall 35 for a slightly greater distance than the remainder of the side wall 37. The free edge 41 of the side wall 37 is stepped as shown at 43 (see FIG. 19). Two shallow, rectangular pockets 45 are provided on the front face of the front wall 35. The pockets 45 are located near the top of the front wall 35, with one pocket 45 close to each side of the front housing 25. A small, rectangular opening 47 is provided at the bottom of each pocket 45 extending through the front wall 35. The opening 47 is centrally located in the pocket 45. A threaded hole 49 (see FIG. 6) extends through the front wall 35 on each side of opening 47 in the pocket 45. The latch operators 13 are mounted in the pockets 45 and the openings 47 in the front housing 25, as will be described hereinafter.

The front wall 35 is provided with a row of vertical slots 51, located between the pockets 45. The dials 17 of the lock means 15 project through the slots 51 from within the housing to be accessible as will be described hereinafter. Preferably the slots 51 are located within a slightly recessed portion 53 of the front wall 35 so that the dials 17 in the slots do not project past the outer surface of the front wall and thus are partly protected. A large, rectangular, lock opening 55 is formed centrally in the front face of the front wall 35 just below the slots 51. A housing lock is mounted within the lock opening 55 to close it as will be described hereinafter.

Figure 6:
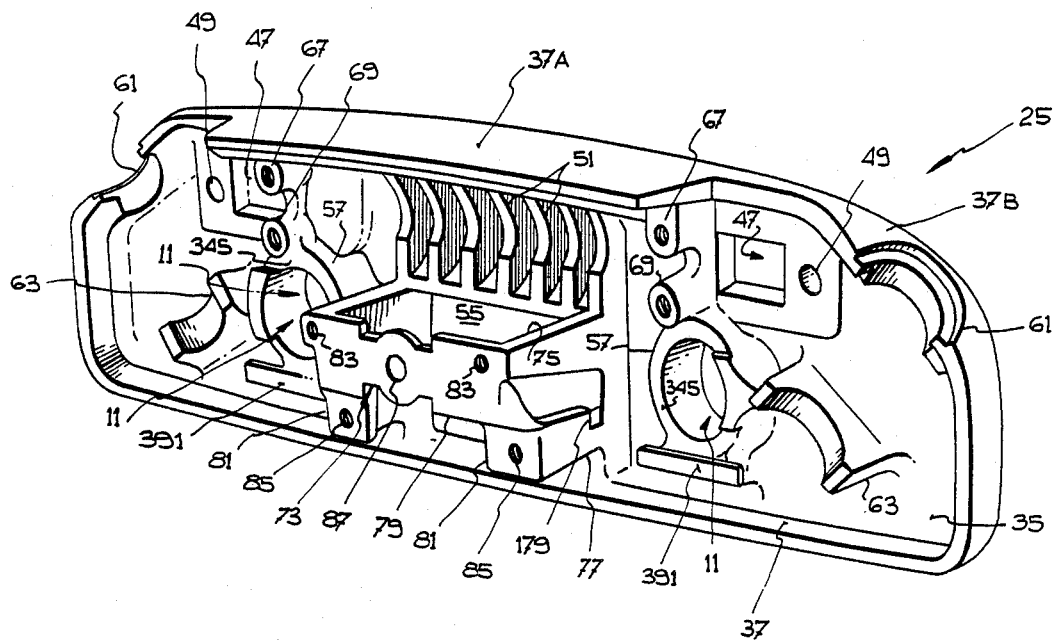
FIG. 6 is a rear perspective view of the front housing of the embodiment shown in FIG. 1.

As better shown in FIG. 6, one locking member receiving opening 11 is located on each side of the central lock opening 55. Each opening 11 is formed in a boss 57 that projects inwardly from the inner surface of the front wall 35 of the front housing 25. Half of a locking member mounting opening 61 is provided in the side wall 37 of the front housing 25, on each side. The top, outer portions 37B of the side wall 37 are angled, and the half mounting opening 61 is provided in this angled portion of the side wall 37. Half of a circular bearing support 63 is associated with each opening 61 and extends inwardly from the inner surface of the front wall, parallel to the side wall portion 37B, but spaced downwardly from it.

A pair of vertical spaced-apart mounting bosses 67, 69 are provided just above the boss 57 on each side of the front housing 25 extending inwardly from the inner surface of the front wall 35. The two pairs of bosses 67, 69 are used in mounting the lock means 15 and the latch means as will be described hereinafter.

Figure 7:
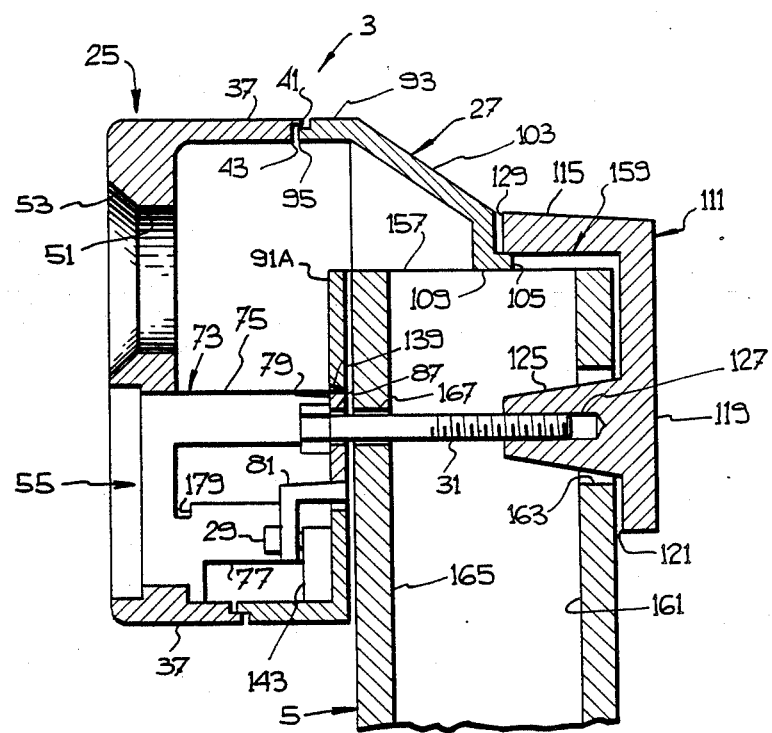
FIG. 7 is a side elevational, cross-sectional view of the assembled housing mounted on the stand.

As better shown in FIGS. 6 and 7, a mounting bridge 73 is constructed on the inner side of the front housing 25 about the central lock opening 55. The bridge 73 comprises a pair of legs 75, 77 on each side of the lock opening 55 extending inwardly from the inner surface of the front wall 35. The upper legs 75 are slightly longer than the lower legs 77. A cross bar 79 is casted or otherwise fastened to the free ends of the upper legs 75, the cross bar extending between them. A stepped extension 81 on each side of the cross bar 79 is welded or otherwise fastened to the lower legs 77. Mounting holes 83 are provided at each end of the cross bar 79. A mounting hole 85 is also provided in each extension 81. A bolt hole 87 is also provided in the center of the cross bar 79.

Figure 5:
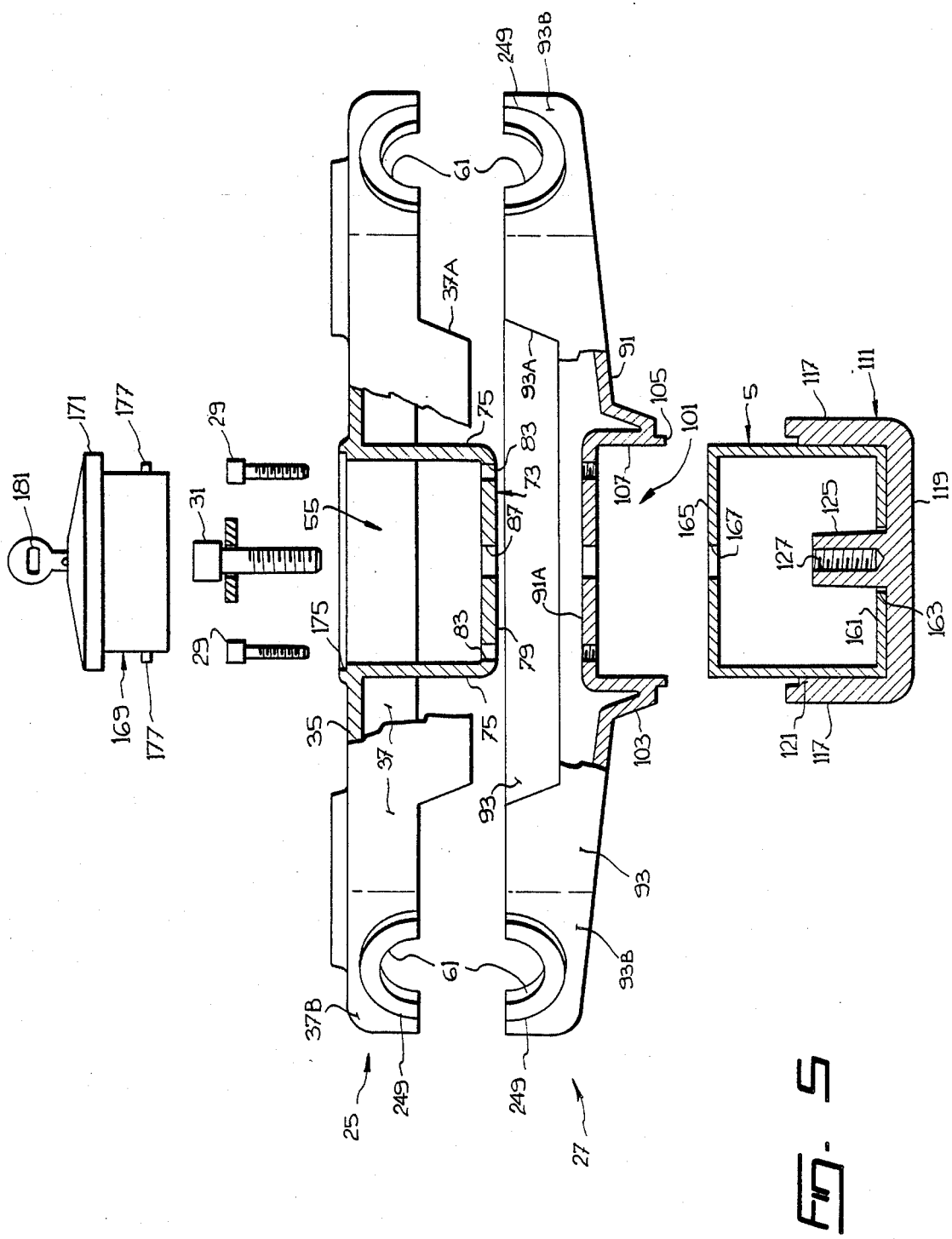
FIG. 5 is a top plan view of the housing parts of the embodiment shown in FIGS. 1 and 2, partly in section, showing how the housing parts are assembled and mounted on the stand.
Figure 8:
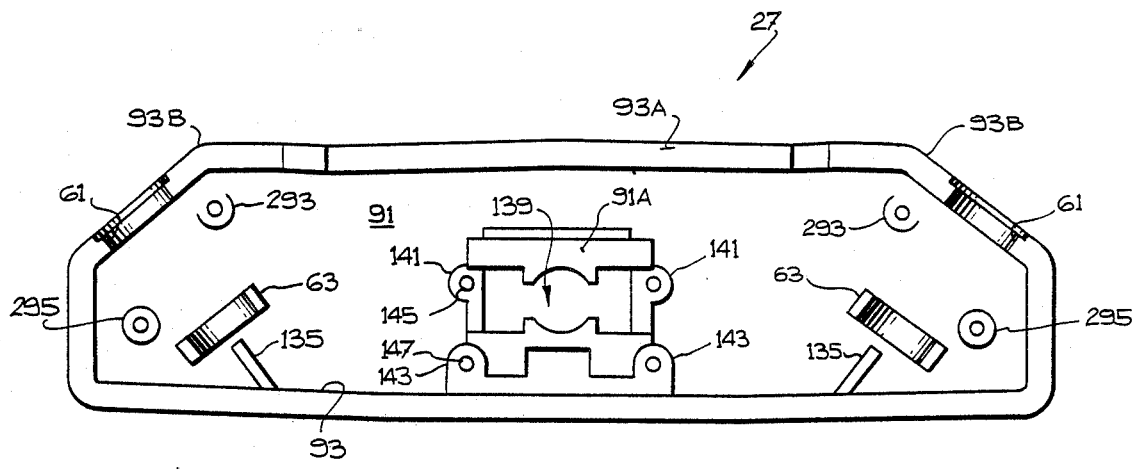
FIG. 8 is a rear elevational view of the rear housing of the embodiment shown in FIG. 1.

The rear housing 27 as shown in FIGS. 5, 7 and 8 has a back wall 91 and an encircling side wall 93. A central, top portion 93A of the side wall 93 is recessed to receive the projecting portion 37A of the side wall 37 of the front housing 25. The free edge 95 of the side wall 93 is stepped as shown at 97, in the opposite sense to how the side wall 37 of the front housing 25 is stepped.

A central mounting pocket 101 is formed in the back wall 91 opening both downwardly and rearwardly. The pocket 101 is partly formed in a central rectangular boss 103 extending rearwardly of the back wall 91. A locating rib 105 projects rearwardly from the boss 103 about the sides 107 and the top 109 of the pocket 101.

Figure 9:
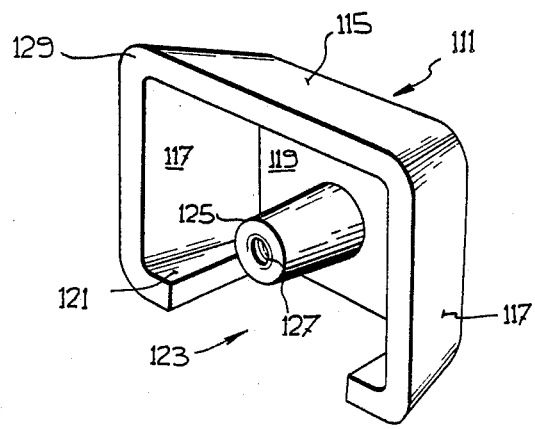
FIG. 9 is a perspective view of the housing cap.

A cap 111 is adapted to be mounted on the boss 103, as will be described hereinafter. The cap 111 forms with the mounting pocket 101, a base socket by means of which the housing 3 can be mounted on the stand 5. The cap 111, as shown in FIGS. 5, 7 and 9, has a top wall 115, side walls 117, a back wall 119 and a bottom wall 121. The bottom wall 121 has a large slot 123 therein. A central boss 125 extends inwardly from the back wall 119. The boss 125 has a central threaded hole 127. The inner edge 129 of the cap 111 sits on the boss 103, on the rear housing 27, with the rib 105 on the boss 103 extending just inside the top and side walls 115, 117 of the cap 111, when the cap is mounted in place.

As shown in FIGS. 5 and 8, half of the locking member mounting opening 61 is provided in the side wall 93 of the rear housing part 27, at each side. The top, outer portions 93B of the side wall 93 are angled as shown and the cable mounting opening 61 is located in this angled, side wall portion 93B. Half of the bearing support 63, associated with each mounting opening 61, also extends inwardly from the inner surface of the back wall 91. The bearing support 63 is parallel to the side wall portion 93B but spaced downwardly of it. A stop member 135 is located on the back wall 91 just beneath each bearing support 63.

The wall portion 91A of the back wall 91 forming the bottom of the pocket 101 has a horizontal slot 139 formed therein, just slightly wider than the width of the cross bar 79. A pair of bosses 141 is provided in the back wall 91, extending inwardly, one at each end of the slot 139. Another pair of bosses 143 is provided in the back wall 91, extending inwardly, one under each boss 141 and adjacent to the side wall 93. The bosses 143 extend inwardly to a greater extent than the bosses 141. The bosses 141, 143 are provided with threaded bores 145, 147 respectively.

The housing 3 is formed by bolting the front and rear housing parts 25, 27 together with the bolts 29 as shown in FIGS. 5 and 7. The housing parts 25, 27 are abutted together at the free edges 41, 95 of their side walls 37, 93 respectively with the undercut portions 43, 97 on the free edges 41, 95 overlapping. The projecting portion 37A of the side wall 37 on the front housing 25 fits snugly into the recessed portion 93A on the side wall 93 of the rear housing 27. The cross bar 79 on the mounting bridge 73 in front housing 25 fits snugly within the slot 139 in the wall portion 91A of the rear housing 27. The bolts 29 are passed through the holes 83 and 85 in the bridge 73 of the front housing 25, from through the lock opening 55, and screwed into the aligned holes 145, 147 in the bosses 141, 143 respectively, of the rear housing 27, to tightly join the housing parts 25, 27 together. When so assembled, the half locking member mounting openings 61 in the housing parts combine to form complete circular locking member mounting openings. Similarly, the half bearing supports 63 combine to form cylindrical bearing supports.

The assembled housing 3 is then mounted on top of the stand 5. As better shown in FIGS. 5 and 7, the upper end 157 of the stand 5 fits into the base socket 159 formed by the pocket 101 on the rear housing 27 and by the cover cap 111. The outer wall 161 of the stand 5 is provided with a large hole 163 rear its upper end to receive the boss 125 of the cap 111. The inner wall 165 has a through hole 167 at its upper end. The mounting bolt 31 is passed through the hole 87 in the cross bar 79 of the bridge 73, through the aligned hole 167 in the stand 5, and threaded into the hole 127 in the cap 111 to securely connect the cap 111 to the housing 3, and to securely connect the housing 3 to the stand 5.

A lock 169 is mounted on the back of a face plate 171 as shown in FIG. 5. The face plate 171 fits snugly within a counterbore 175 provided in the lock opening 55 in the front housing 25, thereby closing it off and preventing access to the connection bolts 29 and mounting bolt 31. The lock 169 which fits snugly within the opening 55, is of the type having laterally sliding locking bars 177. Slots 179 are provided in the lower legs 77 of the bridge 73 as shown in FIGS. 6 and 7. When the lock face plate 171 is mounted in the housing 3 to close off the lock opening 55, as shown in FIG. 1, the lock 169 within the opening 55 is operated by a key 181 inserted through an opening 183 in the face plate 171 to slide the locking bars 177 into the slots 179. Then, the face plate 171 cannot be removed and the bolts 29, 31 are hidden from view and inaccessible.

Each locking member 7, as shown in FIG. 10, may have a rigid mounting bar 185 at one end. The mounting bar 185 has a straight inner section 185A, a straight middle section 185B extending at slightly greater than a right angle to the inner portion 185A, and a short, straight outer section 185C extending at right angle to the middle bar section 185B. A cable 187 is mounted into the mounting bar 185 in such a manner as to extend from the axial center of the free end 189 of the outer mounting bar section 185C. To achieve such a mounting, the mounting bar 185 comprises an axial hole 191 whose end opposite to and away from the free end 189 is flared outwardly as shown at 193. The cable 187 passes into the hole 191 and is securely fastened to the bar section 185A by means of locking nut extending inside the flared end 193 of the hole 191.

A plurality of short cylindrical rods 201 having through axial holes 203, are threaded onto the cable 187. The inner cylindrical rod 201A has a pair of rounded free ends 205A, one of which fits in a rounded socket 207 in the free end 189 of the outer mounting bar section 185C. The other cylindrical rods 201, including the outer one 201B, are each provided with a rounded end 205A and a rounded socket at the other end 205C. An end cylindrical rod 209 with an axial hole 211 is also threaded onto the cable 187. The end rod 209 has a rounded socket 213 on its inner end 215 receiving the rounded free end 205B of the outer rod 201B. The end rod 209 has a flared collar 217 intermediate its ends 215, 219 that tapers outwardly toward the inner end 215 of the rod 209. A cap member 221 is fixed to the free end of the cable 187. A through axial hole 223 is drilled through the cap 221 with the outer end 225 of the hole flared. The cable 187 is passed through the hole 223, flared, and welded to the cap forming a plug to securely fasten the cable to the cap. The inner portion 227 of the cap member 221 is reduced in size to snugly fit into a counterbore 227 in the outer end 219 of the end rod 209. The inner portion 227 is slightly longer than the depth of the counterbore 229 to form a circular locking slot 231 between the shoulder 233 on the cap 221 and the outer end 219 of the outer rod 209. To assemble the locking members 7, the cylindrical rods 201 are threaded on the cable 187 tightly together between the mounting bar 185 and the cap 221 with their rounded ends 205A and 205B matching their rounded sockets 205C. Then the cable 187 is tightened and fixed to the cap 221. After the cable 187 has been so fixed to the cap 221, a plastic or rubber sleeve 235 is mounted over the locking member 7. The sleeve 235 extends from the collar 217 to the inner section 185C of the mounting bar 185.

As can now be understood, each locking member 7 has flexibility imparted by the cylindrical rods 201 threaded onto the cable 187. Thus, the locking member 7 can be bent into an almost complete circle as shown in FIG. 2.

Figure 11:
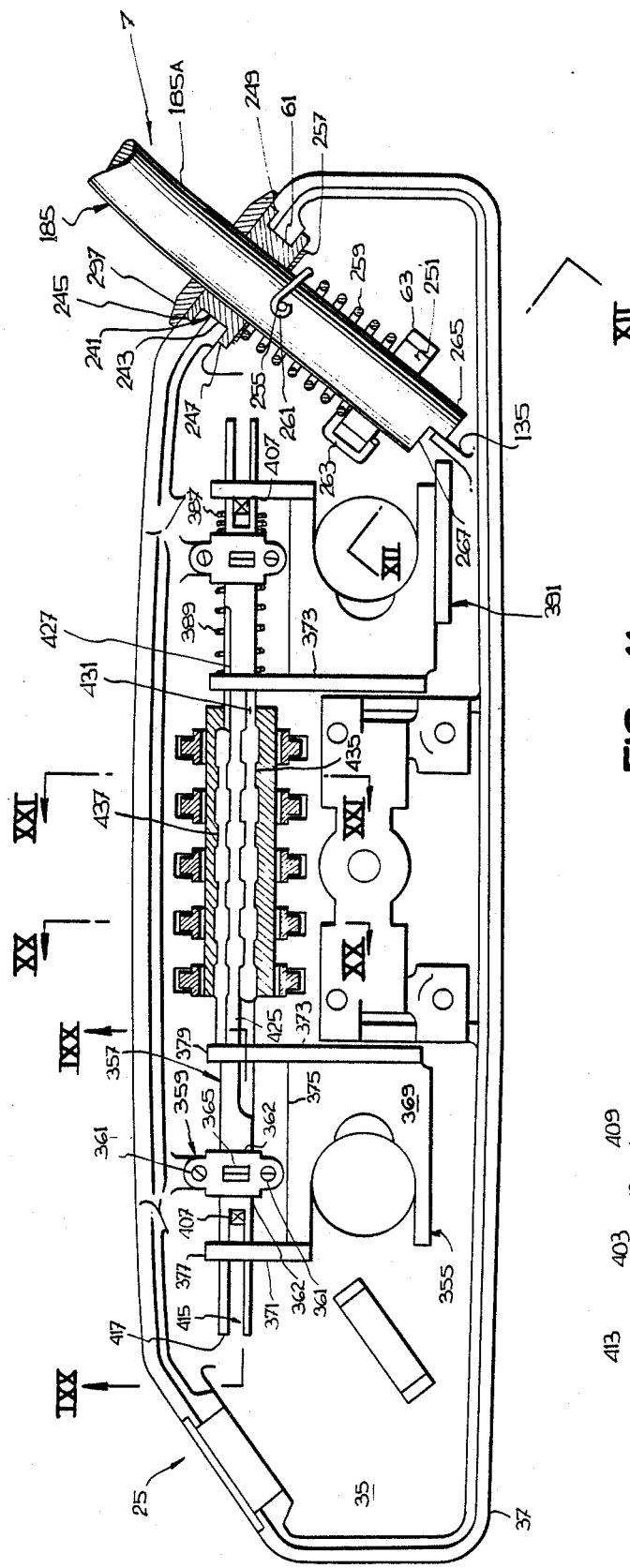
FIG. 11 is a rear elevational view of the front housing showing the mounting of the locking member.

Means are provided for securely mounting one end of each locking member 7 rotatably within the housing 3. The locking member mounting means, as shown in FIG. 11, includes a first mounting collar 241 adapted to be mounted within each mounting opening 61. Each first mounting collar 241 has an annular body portion 243 with a thin annular flange 245, 247 at each end. A shallow counterbore 249 is provided in opening 61 on the outer surface of the housing 3 for receiving the flange 245 of the collar 241. The collar 241 is mounted in the opening 61 before joining the housing parts 25, 27 together, with the flange 245 located in the counterbore 249, and with the flange 247 bearing against the inner surface of the side walls 37, 93 of the housing parts 25, 27. The flange 247 prevents the mounting collar 241 from being withdrawn from the housing 3.

A second mounting collar 251 is mounted within the cylindrical bearing support 63 formed by the half bearing supports on the housing parts 25, 27.

Both the first and second mounting collar 241, 251 are axially aligned and receive the inner portion 185A of the mounting bar 185 to rotatably mount the locking member 7 within the housing 3. The collars 241, 251 are made of suitable plastic material and are preferably fixed to the housing 3 with suitable fastening means (not shown), with the mounting bar 185 rotating relative to the collars. Alternatively, the collars 241, 251 may be fixed to the mounting bar 185 and rotate in the housing 3.

Figure 12:
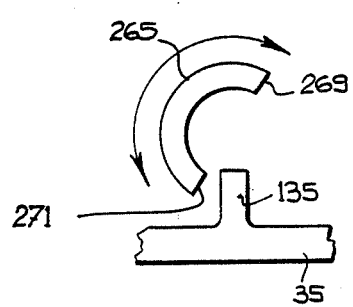
FIG. 12 is a cross-section view taken along line XII—XII of FIG. 11.

With the mounting bar 185 mounted in the collars 241, 251, a stop pin 255 is inserted in the inner portion 185A of the mounting bar 185 just beneath the outer collar 241. The stop pin 255 projects radially from the mounting bar 185 and prevents the mounting bar 185 from being withdrawn from the housing 3 when the housing is assembled with the collars and mounting bar in place. A washer 257 can be loosely mounted on the mounting bar 185 between the pin 255 and the collar 241. A tension spring 259 is mounted about the mounting bar section 185A within the housing 3 between the pin 255 and the inner mounting collar 251. One end 261 of the spring 259 is hooked and mounted over the stop pin 255. This end 261 of the spring 259 bears against the washer 257 and thus prevents longitudinal movement of the mounting bar 185 relative to the housing 3. The other end 263 of the spring 259 is also hooked and mounted over the bearing support element 63. A semi-circular stop wall 265 projects from the free end 267 of the inner mounting bar portion 185A to cooperate with the stop member 135 at each end of the housing 3 to limit rotation of the mounting bar 185 relative to the housing 3. As better shown in FIG. 12, one end 269 of the stop wall 265 abuts the stop member 135 when the mounting bar 185 is rotated in one direction, and the other end 271 of the stop wall 265 abuts the stop member 135 after rotation of the mounting bar 185 through one hundred and eighty degrees. The spring 259 biases the mounting bar 185 back to a rest position where the middle sections 185A of the mounting bar 185 extend rearwardly of the housing and slightly toward each other as shown in FIG. 1. In the operative position, the middle sections 185A of the mounting bars 185 rotate outwardly and to the front of the housing 3 as shown in FIGS. 2 and 13, until stopped by the other end 271 of the stop wall 265.

Figure 13:
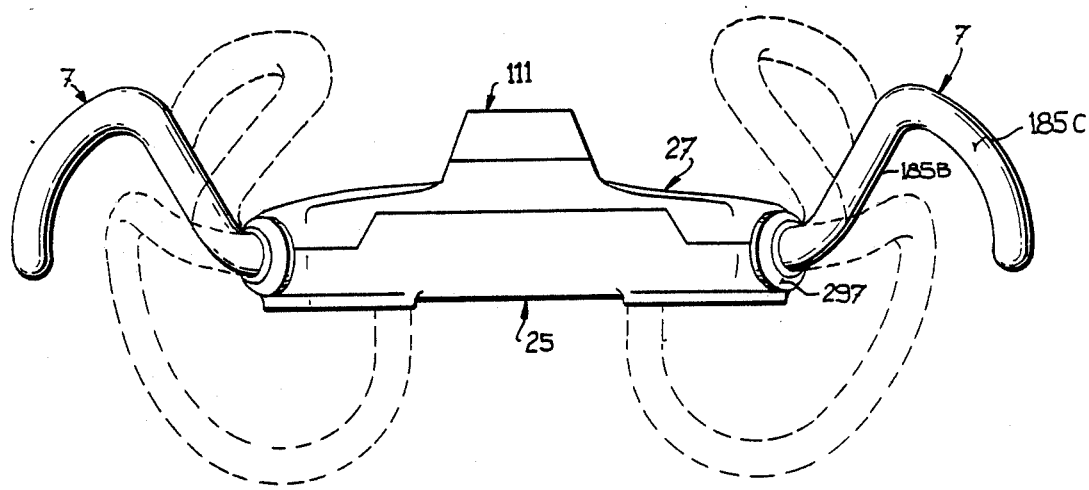
FIG. 13 is a top plan view similar to FIG. 5, showing the locking members in inoperative and operative positions.

As shown in FIGS. 11 and 13, a metal cover 297 can be fixed to the inner section 185A of the mounting bar 185 to cover and protect the first mounting collar 241.

Figure 46:
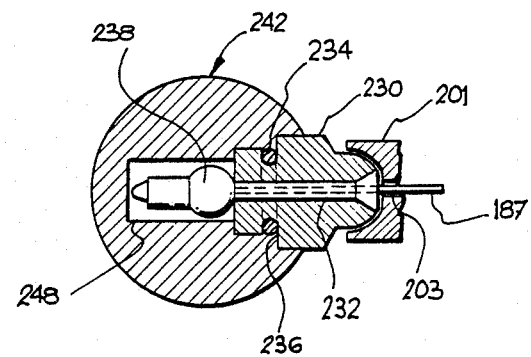
FIGS. 46 and 47 are a top plan view and a side elevational view respectively, showing both in cross-section another way of mounting a locking member onto the housing.
Figure 47:
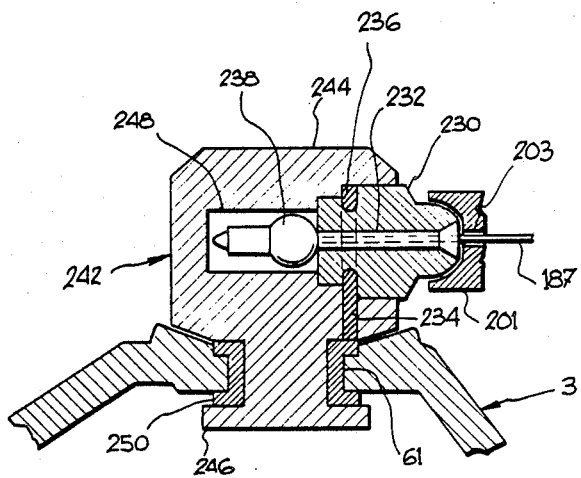

According to a variant of simpler structure and mounting as shown in FIG. 46 and 47, each locking member 7 does not comprise any rigid mounting bar 185 as shown in FIG. 10 to provide a proper connection of the plurality of short cylindrical rods 201 threaded onto the cable 187 onto the housing. Rather, the rounded socket of the inner rod 201 is fitted onto the rounded end of a small plug 230 provided with an axial hole 232. The plug 230 is detachably mounted into a hole 248 radially extending into the external flange 244 of a mounting head 242 adapted to be mounted within a mounting opening 61 of the housing 3. Mounting of the plug 230 in the radial hole 248 of the flange 244 is achieved by inserting a U-shaped clip 234 through a transversal slot provided for this purpose in the base of the flange 244 of the head 242, with the arms and both an edge of the clip 234 snuggly fitted into a peripheral groove 236 extending around the plug 230. The mounting head 242 also has an internal flange 246 whose purpose is to prevent the locking member 7 from being withdrawn from the housing. If desired, a collar 250 made of a self-lubrifiant material may be used to facilitate installation and rotation of the head 242 into the opening 61.

The cable 187 which passes into the hole 232 of the plug 230, is securely fastened to the same and thus to the mounting head 242 and housing 3 by means of a locking nut 238. Of course the hole 248 is sized to give room to this nut 238 inside the head 242 behind the plug 230, as clearly shown in the drawings.

Latch means are provided within the housing for holding the free ends 9 of the locking members 7 within the housing when they are passed into the housing through the openings 11.

Figure 15:
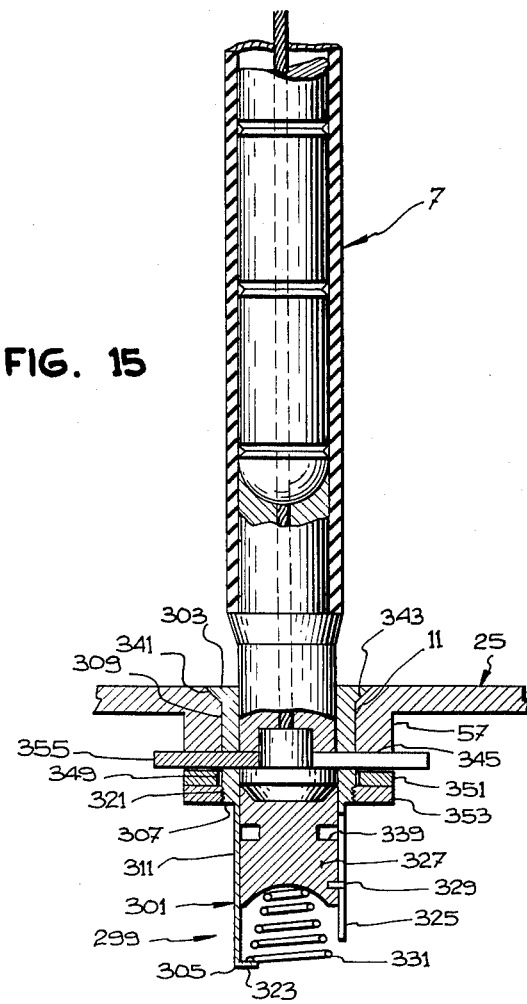
FIG. 15 is a cross-sectional view showing the locking member held within the housing.
Figure 16:
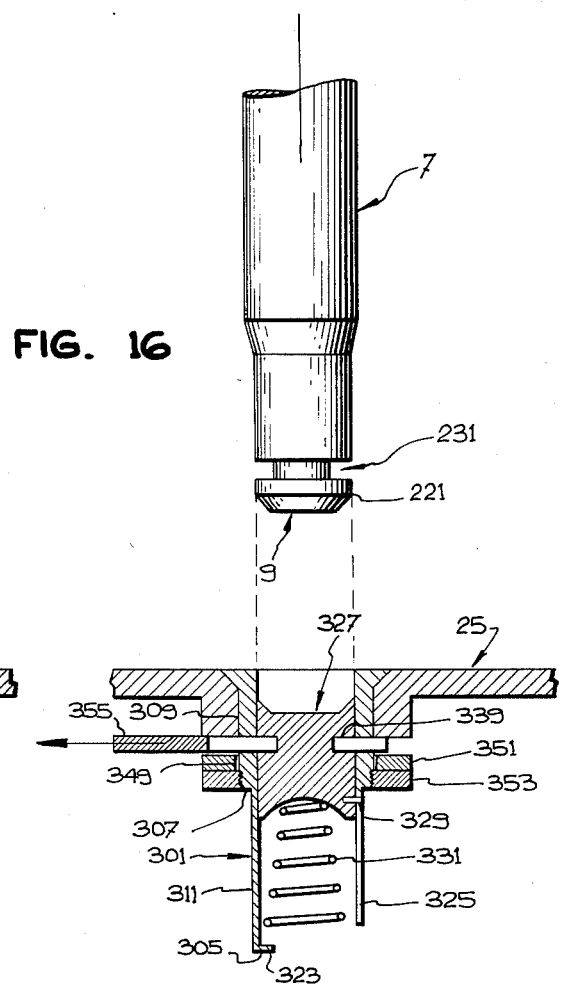
FIG. 16 is a cross-sectional view similar to FIG. 15, showing removal of the locking member from the housing.

As shown in FIGS. 14 to 16, the latch means include a socket 299 mounted in each opening 11 for receiving the free end 9. The socket 299 has a tubular body 301 with an outer end 303 and an inner end 305. A shoulder 307 intermediate the outer and inner ends 303, 305 divides the body 301 into an outer, tubular body portion 309, adjacent the outer end 303, and an inner, tubular body portion 311, adjacent the inner end 305. The inner body portion 311 is smaller in diameter than the outer body portion 309. A cylindrical bore 313 extends through the tubular body 301 between the outer and inner ends 303, 305. The outer body portion 309, adjacent the outer end 303, has an outwardly flared portion 315. A radially extending locating notch 317 is provided in the flared portion 315. The outer body portion 309, adjacent the shoulder 307, is threaded as shown at 321. Stop arms 323 extend radially inwardly from the inner end 305 of the socket body 301 to partly close the cylindrical bore 313 at the inner end 305. A guide slot 325 extends longitudinally in the inner body portion 311 from the inner end 305 up close to the shoulder 307.

A cylindrical closure plug 327 is mounted within the bore 313. The closure plug 327 fits snugly within the bore 313 and is slidable therein. A guide pin 329 extends radially from the side of the plug 327 and slides in the guide slot 325. A spring 331 is mounted within the bore 313 between the stop arms 323 and the plug 327, to permanently bias the plug 327 outwardly so that the guide pin 329 is at the end of the slot 325 and the outer end 333 of the plug 327 is near the outer end 303 of the socket 299 (see FIG. 16). The guide pin 329 retains the closure plug 327 within the bore 313 and is installed in the plug during assembly of the plug 327 and spring 331 within the bore.

A tangential locking slot 335 is provided in the outer body portion 309 of the socket 299 near the threads 321. The locking slot 335 intersects the bore 313 and extends transversely to the longitudinal axis of this bore 313. A circumferential locking slot 339 extends about the closure plug 327. This locking slot 339 is aligned with the locking slot 335 in the socket 299 when the plug 327 is biased outwardly by the spring 331.

Each socket 299 is adapted to be snugly mounted within a cable receiving opening 11 in the front housing 25. The mouth 341 of the opening 11 is bevelled so as to receive the flared portion 315 on the first body portion 303 of the socket 301. A tab 343 in the mouth of the opening 11 receives the locating notch 317 on the socket 299 so as to correctly locate the socket 299 within the opening 11 with respect to its locking slot 335. The socket 299 passes through the opening 11 in the boss 57 with the threaded portion 321 located just past the inner face 345 of the boss 57. The socket 299 also passes through a slot in a sliding latch member, as will be described hereinafter, and through a hole 349 in a guide plate 351. A lock nut 353 is threaded onto the socket 299 to lie snug against the guide plate 351, so as to securely lock the socket 299 to the front housing 25.

As shown in FIGS. 11 and 17 to 19, the latch means also include a sliding latch plate 355, associated with each socket 299, and slidably mounted on a carrying rod 357. The carrying rod 357 extends across the center of the front housing 25 and is mounted at each side to the pairs of mounting bosses 67, 69 (see FIG. 6). A rod mounting plate 359 is mounted against the free ends of each pair of bosses 67, 69 by screws 361. Each plate 359 has ears 362 with holes 363 therein through which the rod 357 is mounted. A stop tab 365 on each plate 359 cooperates with a shoulder 367 near each end of the rod 357 to hold the rod 357 against rotation and longitudinal movement.

The latch plate 355 has a flat plate section 369 with a pair of mounting arms 371, 373 extending from one side 375 of the plate section. Each arm 371, 373 has an enlarged free end 377, 379 respectively with a hole 381, 383 through each end by means of which the latch plate 355 is slidably mounted on the rod 357. One mounting arm 371 is mounted on the rod 357 outwardly of the mounting plate 359 and the other mounting arm 373 is mounted on the rod 357 inwardly of the mounting plate 359. A first strong biasing spring 387 is located between the arm 371 and the mounting plate 359. A second biasing spring 389 weater than the first one is located between the arm 373 and the mounting plate 359.

The latch plate 355 is vertically guided for movement between on the one hand, the inner face 345 of the boss 57 and the guide plate 351 and, on the other end, the boss 69 and a guide rib 391 provided at the bottom of the boss 57. The latch plate 355 has a U-shaped slot 393 extending into the plate section 369 form its outer side 395. The bottom of the U-shaped slot 393 has a semi-circular extension 397. The socket 299 passes through the slot 393 in the latch plate 355 with the locking slot 335 in the socket 299 facing the extension 397 in the latch plate 355 and aligned with the latch plate.

Figure 19:
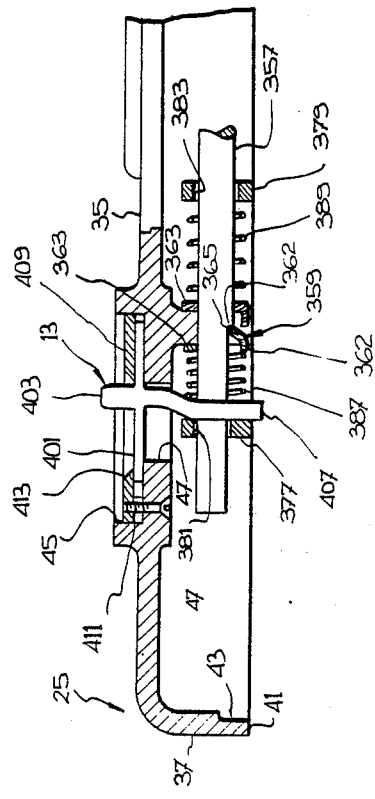
FIG. 19 is a cross-sectional, top plan view of the front housing taken along line IXX—IXX of FIG. 11, showing details of the latch means.

The latch operators 13 on the housing 3 operate the latch plates 355 to receive the free ends 9 of the locking members 7. Each latch operator 13, as shown in FIG. 19, comprises a slide plate 401 having an actuating tab 403 projecting from the center of the plate 401 on one side, and an actuating finger 407 projecting from the center of the plate 401 on the other side. The slide plate 401 is mounted for sliding movement in the pocket 45 in the front of the front housing 25. The actuating finger 407 extends through the opening 47 in the pocket 45 into the housing. A cover plate 409 is fastened to the front housing 25 by screws 411 threaded through the holes 49 provided into the back of the cover plate. This cover plate 409 overlies the slide plate 401 and has a central rectangular opening 413 through which the tab 403 projects. The actuating finger 407 of the latch operator 13 extends into a slot 415 extending longitudinally into the carrying rod 357 from its outer end 417. The actuating finger 407 is located adjacent the outer mounting arm 371 of the latch member 355, adjacent the side of the arm 371 facing the mounting plate 359. The first biasing spring 387 is between the actuating finger 407 and the mounting plate 359.

When the latch means are assembled within the housing 3, along with the latch operating means 13, the first spring 387 biases the actuating finger 407, and the latch plate 355, via its mounting arm 371, outwardly, against the action of the weaker second spring 389. The inner locking edge 421 of the latch plate 355 defined by the semi-circular slot extension 397 fits in the locking slot 339 in the closure plug 327, after passing through the locking slot 335 in the body 301 of the socket 299. The socket opening 11 is thus normally closed by the closure plug 327.

Figures 17, 18:
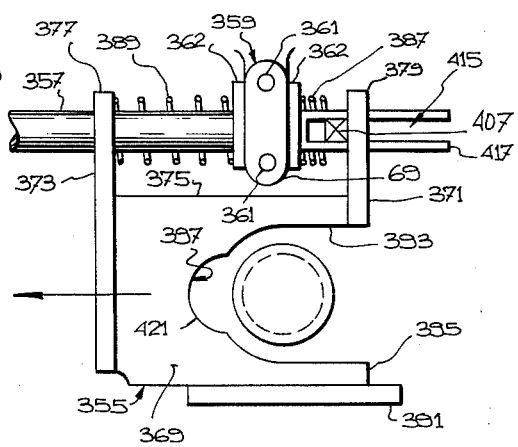
FIG. 17 is a detail view of the latch plate in a latched, or holding position.
FIG. 18 is a detail view of the latch plate in an unlatched or non-holding position.

When the free end 9 of the locking member 7 is to be inserted into the opening 11, the actuating tab 403 of the latch operator 13 is manually moved inwardly to compress the first spring 387 with the actuating finger 407. This allows the second spring 389 to move the latch plate 355 inwardly. Thus, the latch plate 355 moves out of the slot 339 in the closure plug 327, allowing the free end 9 of the locking member to be pushed into the opening 11 and more specifically into the socket 299. As the free end 9 moves into the socket 299, it pushes the closure plug 327 inwardly against the action of the spring 331 (see FIGS. 17 and 18). The actuating tab 403 of the latch operator 13 is now released and the first spring 387 biases the latch plate outwardly. As the locking slot 231 formed by the cap 221 on the free end 9 of the locking member passes the edge 421 of the latch plate 355, the first spring 387 moves the latch plate outwardly to enter the locking slot 231 and hold the end 9 within the housing 3 as shown in FIGS. 15 and 17.

The free end 9 of the locking member can be released by moving the actuating tab 403 inwardly to move the latch plate 355 out of the slot 231. Then, the closure plug 327 moves outwardly under the action of spring 331 to eject the end 9 as shown in FIG. 16.

As aforesaid, lock means 15 provided with dials 17, are employed to prevent unauthorized movement of the latch plates 355 once the free ends 9 of the locking members 7 are held in place within the housing 3 by the plates.

Figure 20:
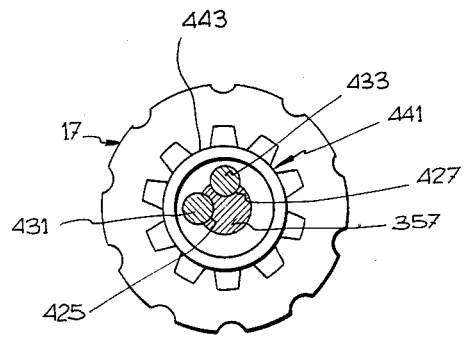
FIG. 20 is a cross-sectional view taken along line XX—XX of FIG. 11.
Figure 21:
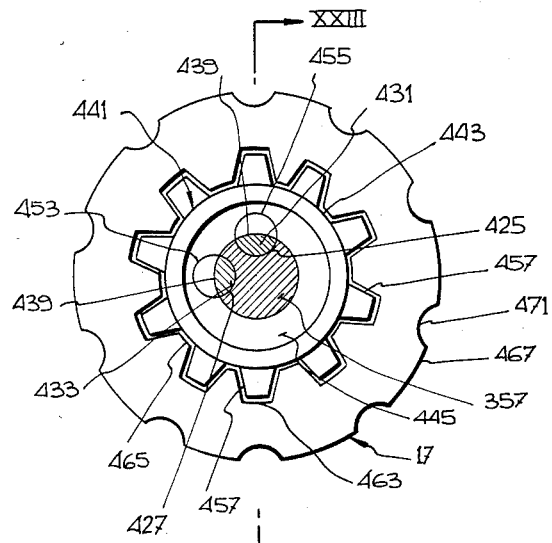
FIG. 21 is a cross-sectional view taken along line XXI—XXI of FIG. 11.

The lock means 15 includes the carrying rod 357 mounted within the housing 3. The carrying rod 357 has two longitudinal guide grooves 425, 427 in its central area, arranged side-by-side as shown in FIGS. 11, 20 and 21. A first notched locking pin 431 extends laterally from the inner arm 373 of the latch plate 355 on one side of the housing 3 to sit in the guide groove 425. A second, notched locking pin 433 extends laterally from the inner arm 373 of the locking plate 355 on the other side of the housing 3. This second locking pin 433 sits in the other groove 427 alongside the first locking pin 431. When the pins 431, 433 are located in the grooves, approximately half of the normal cross-sectional area of each pin is above the surface of the rod 357. Each pin 431, 433 has a number of spaced-apart notches or slots 435, 437, respectively, along its length equal in number to the number of dials 17. The notches 435, 437 on the two pins 431, 433 are normally aligned in pairs when the two latch plates 355 are in a locked position. The notches 435, 437 extend halfway into the locking pins 431, 433 and the bottom surfaces 439 of the notches are rounded so that the surfaces 439 merely extend the original outer surface of the carrying rod 357 when the pins 431, 433 are in the grooves 425, 427 as shown in FIG. 21.

A locking collar 441 is associated with each locking dial 17 as shown in FIGS. 20 to 26. Each locking collar 441 has a wide tubular outer skirt 443 and a narrow diametrically-extending web 445 within the skirt 443. The web 445 is positioned between the ends 447, 449 of the skirt 443. A central through bore 451 extends through the web 445 through which the carrying rod 357 passes. Semi-circular cutouts 453, 455 are provided in the bore 451 to receive the locking pins 431, 433 when the pins are mounted in the grooves 425, 427 in the rod 357. Each collar 441 has a circle of ten locking studs 457 projecting radially outwardly from the outer surface of the skirt 443 aligned with the web 445.

Figure 25:
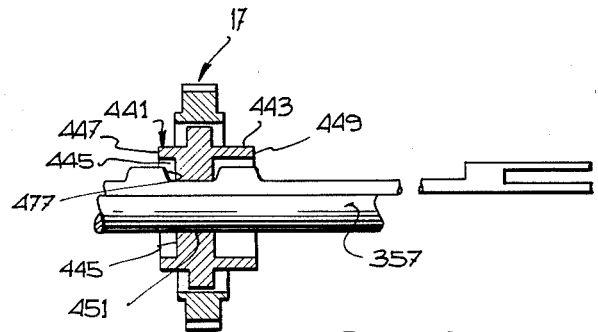
FIGS. 24 and 25 are views similar to FIG. 23.
Figure 24:
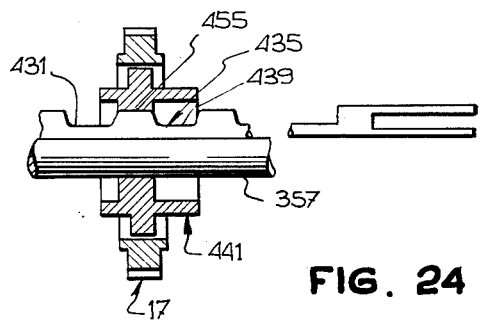
Figure 23:
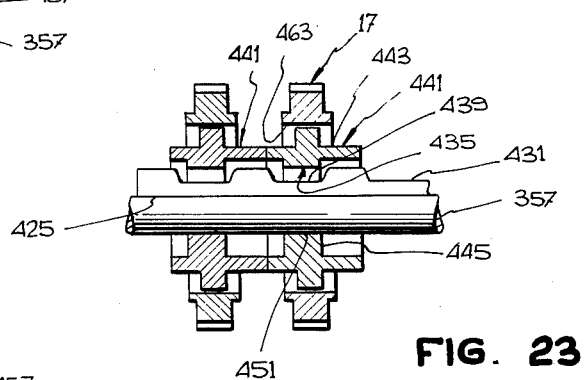
FIG. 23 is a cross-sectional view taken along line XXIII—XXIII in FIG. 21.
Figure 22:
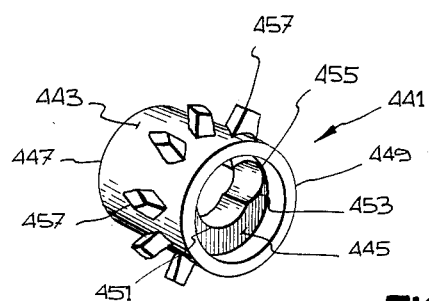
FIG. 22 is a perspective view of a locking collar.
Figures 26, 27:
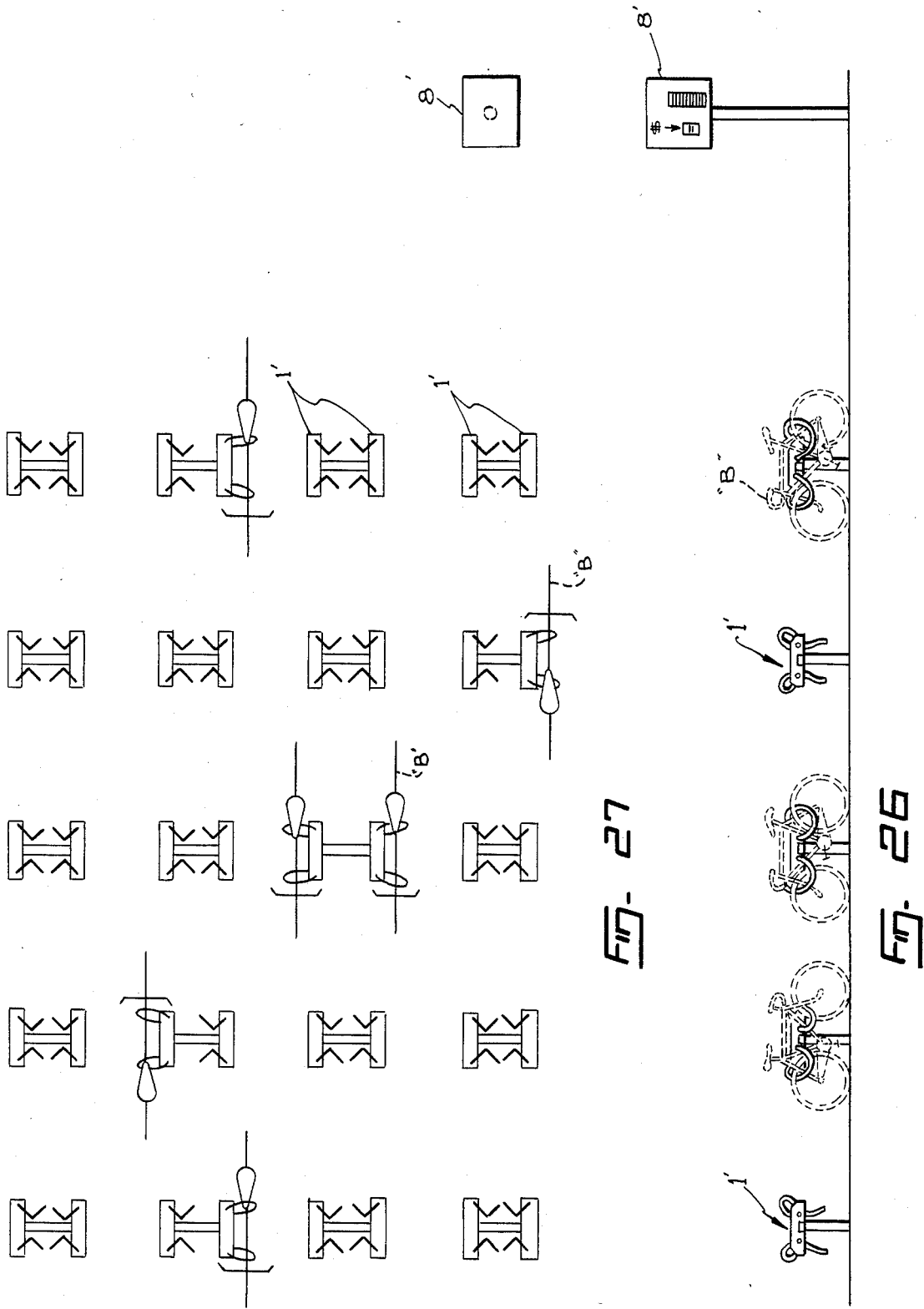
FIGS. 26 and 27 are side elevational and top plan views respectively, of a variant of the embodiment shown in FIG. 3, making use of a single coin-operated timer for a plurality of locking fixtures.

Each dial 17 of the lock means 15 comprises a ring having ten radially inwardly extending locking slots 463 on its inner surface 465 and ten lands 467 on its outer surface. The numbers zero to nine are written on the lands 467 in sequence, one number on each land. The lands 467 are separated by shallow grooves 471. The five locking collars 441 are mounted on the carrying rod 357, over the locking pins 431, 433, with their skirts 443 abutting and with the locking studs 457 on each collar 441 aligned with a slot 51 in the housing 3 as partly shown in FIG. 23. Suitable means (not shown) fasten the collars 441 longitudinally in place on the carrying rod 357. A dial 17 is mounted on each collar 441 with its slots 463 receiving the studs 457 on the collar. The dial 17 projects slightly through each wall slot 51 and is held in place against lateral movement relative to its associated collar 441 by the walls of the slot 51. Each dial 17 is mounted on its collar 441 to have a selected number on the lands 467, show through the slot 51 at a mark line 475 (see FIG. 4) marked on the housing adjacent the slots. When the selected number on each dial shows through the slot 51, the cutouts 453, 455 in the web 445 on the associated locking collar 441 are aligned with locking pins 431, 433 as shown in FIGS. 24, 25 and 27. With the cutouts 453, 455 on each collar 441 aligned with the locking pins 431, 433 the latch plates 355 are free to slide to a non-holding position when actuated by the latch operators 13. As the latch plates 355 slide, so do the locking pins 431, 433 in the grooves 425, 427 on the rod 357, the pins sliding through the cutouts 453, 455 as shown in FIG. 24.

Figure 29:
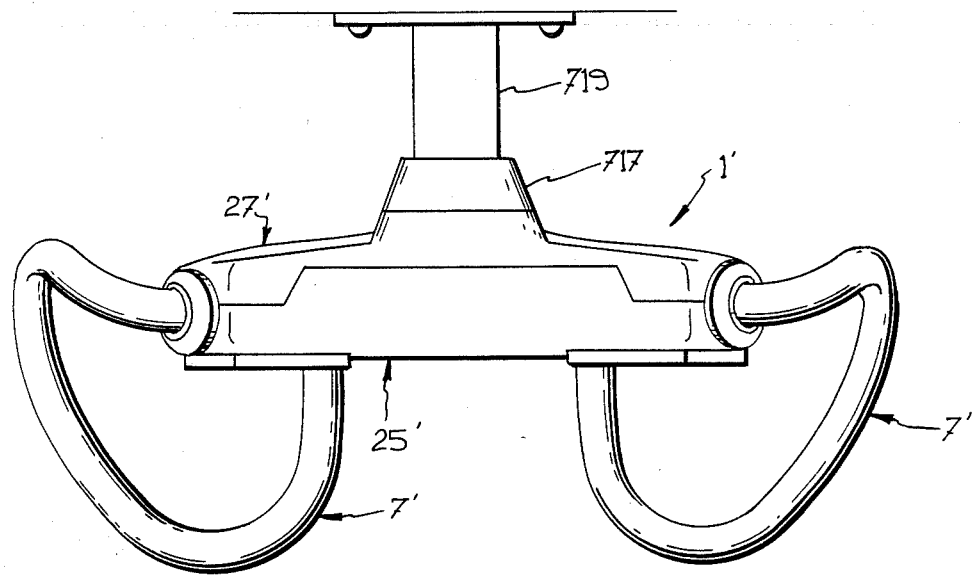
FIG. 29 is a top plan view of the locking fixture shown in FIG. 28.

Any or all of the dials 17 can normally be rotated, while the latch plates 355 are in their holding position, because the locking pins are located with their notches 435, 437 under the webs 445 of the locking collars 44 as shown in FIG. 27. The notches 435, 437 are deep enough to allow the collars 441 to rotate over the pins as shown in FIG. 25 when the collars are rotated by the dials via their slot 463 and stud 457 connections. If at least one of the dials 17 is rotated so as not to have its selected number show at the guide line 475, then at least one of the latch plates 355 cannot be moved. This is because at least one of the cutouts 453, 455 on the collar 441 associated with the rotated dial 17 is now misaligned with one of the locking pins 431, 433 due to rotation of the collar 441 by the dial 17. Attempted movement of the latch plate 355 associated with the one locking pin now causes the side 477 of a notch in the pin to abut the collar 441 as shown in FIG. 29 and prevent movement of the pin and thus of the latch plate effectively locking it in a holding position.

The above disclosed fixture 1 which comprises a lock means having only one preselected combination for operating it, is of course intended to be used by a single person exclusively, who is aware of the correct combination. Such a fixture can be used, for example, in business places or campuses, where it can be rent on a long time basis to a worker or a student who wants to safely park his or her bicycle. After such a rent, the "combination" of the lock means can be easily changed by opening the housing, raising the mounting rod 357, sliding one or more of the dials 17 laterally off its associated collar 441, rotation it to provide a new selected number, and sliding it back on its associated collar 441 in its new rotated position.

The locking fixture 1 is easy to use for the person who knows the correct combination. The fixture is very study and difficult to vandalize. Indeed, the housing is difficult to take apart and to remove from its stand. The semi flexible locking members 7 are designed to garantee complete resistance to any cutting effort while maintaining the flexibility to handle any size of bicycle. The flexible rubber sleeve 235 ensures that the levers will neither corrode nor scratch the bicycle frame, and the spring-loading returns the levers to the vertical space saving position when the fixture is not in use. Moreover, due to its construction and more particularly to the fact that the actuating fingers 407 of the latch operators 13 are slidably mounted in slots 415 provided in the carrying rod 357 and are never rigidly connected to this rod 357, the mechanical connection being indeed achieved through the springs 387 and 389, one cannot use the only movable parts external to the housing, namely the latch operators 13, to tamper with the latch means themselves or the locking means. Indeed, the springs 387 and 389 act as resilient means and give a protective slack to the connection.

The locking fixture 1 according to the first embodiment of the invention has been described as employing two locking members 7 and a combination lock means 15 including a plurality of dials for use to dial a preselected code number. These particular features are interesting but they are not essential and may be changed depending on the intended use of the fixture and the user's requirement.

Thus, as already explained hereinabove use can be made for some very particular applications, of a locking fixture 1" as shown in FIG. 4, comprising a single locking member 7". This fixture 1" which is substantially identical in structure and operation to the fixture 1 except that it comprises a single latch controlled by the lock means to block its single locking member 7", is particularly well adapted to parking mopeds or light motocycles.

Use can also be made for some other applications of a locking fixture (not shown) whose structure and mechanism are substantially identical to those of fixture 1, except that it comprises a standard keylock instead of a lock means of the combination type. The lock is mounted inside the housing in such a manner as to prevent displacement the latch means when locked with the key. This kind of key-operated locking fixture is particularly well adapted for permanent use by bike owners in place like, for example, the garage of an apartment building.

According to another embodiment of the invention shown in FIG. 3, a locking fixture 1' is provided for use with a coin-operated timer 8 similar to those used in most of the parking meters. The timer 8 may be connected to the lock means of the fixture 1' to prevent these lock means from being operated either to lock (or unlock) a vehicle with the locking members 7' untill a sufficient amount of money has been inserted. Such a blocking of the fixture lock means may be easily achieved with a latch (not shown) mechanically connected to the time 8 and which, in the absence of coins, engages the latch means and prevents them from being actuated.

The locking fixture 1' is preferably provided with locking means that are of the reset type and can be reprogrammed after each use as will be described hereinafter, so that, after insersion of a suitable amount of coin, any user may set his or her own number, and lock his or her bicycle. To free the bicycle, the cyclist has just to dial back the number originally set to unlock the locking members 7'. To prevent the bicycle from getting freed in the absence of his or her owner, the timer 8 has to be designed so that there is no time limit. If the prepaid time has elapsed, the cyclist will only have to insert additional coins to release the blocking latch.

FIGS. 26 and 27 show a variant of the embodiment shown in FIG. 3.

According to this variant, a single coin-operated timer 8' is used for controlling a plurality of locking fixtures 1'. The timer 8' may be electrically connected to every fixture 1' to unlatch the latch means inside this fixture 1' as soon as the rental time has been fully paid by the owner of a bicycle B locked thereby. This particular embodiment may be of a great interest for a private enterprise as it allows entier control of a parking lot including a great number of locking fixture 1' with a single attendant.

The basic structure of the locking fixture 1' provided with locking means that can be "automatically" reset after each use in order to be selectively re-programmed by a next user, will now be described with reference to FIGS. 28 to 44. Although the fixture 1' shown in these FIGS. 28 to 44 has an internal structure which is completely independent from the structure of the coin-operated timer 8 shown in FIG. 3, it may however be understood that both elements (i.e. the fixture 1' and timer 8) may be combined and operatively connected as explained hereinabove.

Except for its latch means, its lock means and, of course, its reset mechanism, the structure of the locking fixture 1' is identical to the structure of the fixture 1, that has been previously described. For this reason, the same structural elements will be hereinafter identified with the same reference numerals marked with a prime (').

Figure 28:
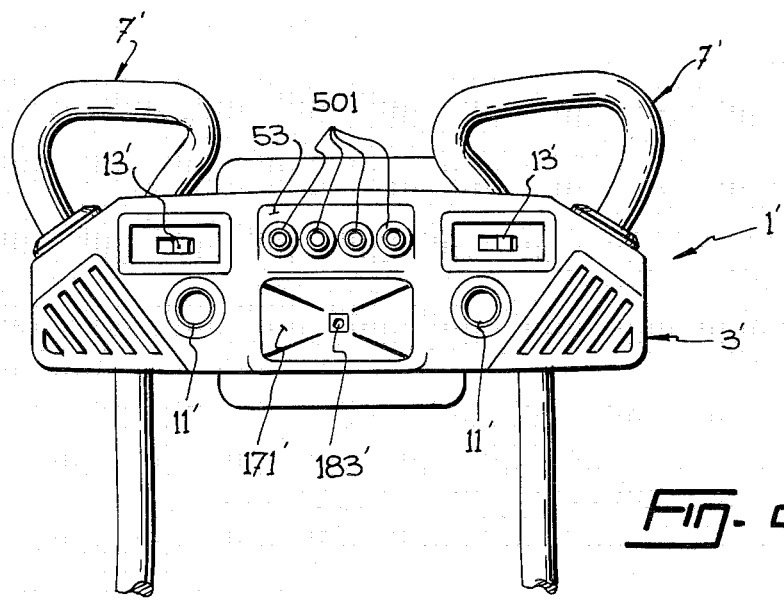
FIG. 28 is a front elevational view of a locking fixture according to a fourth embodiment of the invention.

As shown in FIGS. 28 and 29, the locking fixture 1' has a housing 3' having substantially the same structure as the housing 3, except that it comprises a set of rotatable knobs 501 instead of a set of dials 17 on the front surface of its front part 25'. Each knob is provided with a plurality of numbers all around its periphery (see FIG. 30) and is intended to be rotated together with the other knobs to dial 15 a predetermined "combination" number which, if correct, unlocks the latch means and allows removal of the end of the locking numbers 7' from the openings 11'.

The knobs 501 are advantageously located within a recessed portion 53' of the front wall of the housing 3', deep enough to prevent the knob 501 from projecting past the outer surface of this front wall and thus being subjected to whacks.

The locking fixture 1' may be mounted onto a vertical stand as shown in FIG. 27. However as shown in FIG. 29, it may also be mounted onto a wall by means of a cap 717 from which integrally and rearwardly extend a fixation tube 719. The cap 717 can be fixed to the housing 3' substantially in the same way as the cap 111 shown in FIGS. 5, 6 and 9, that is through the opening 55' provided in the front wall of the housing (see FIG. 30).

Figure 30:
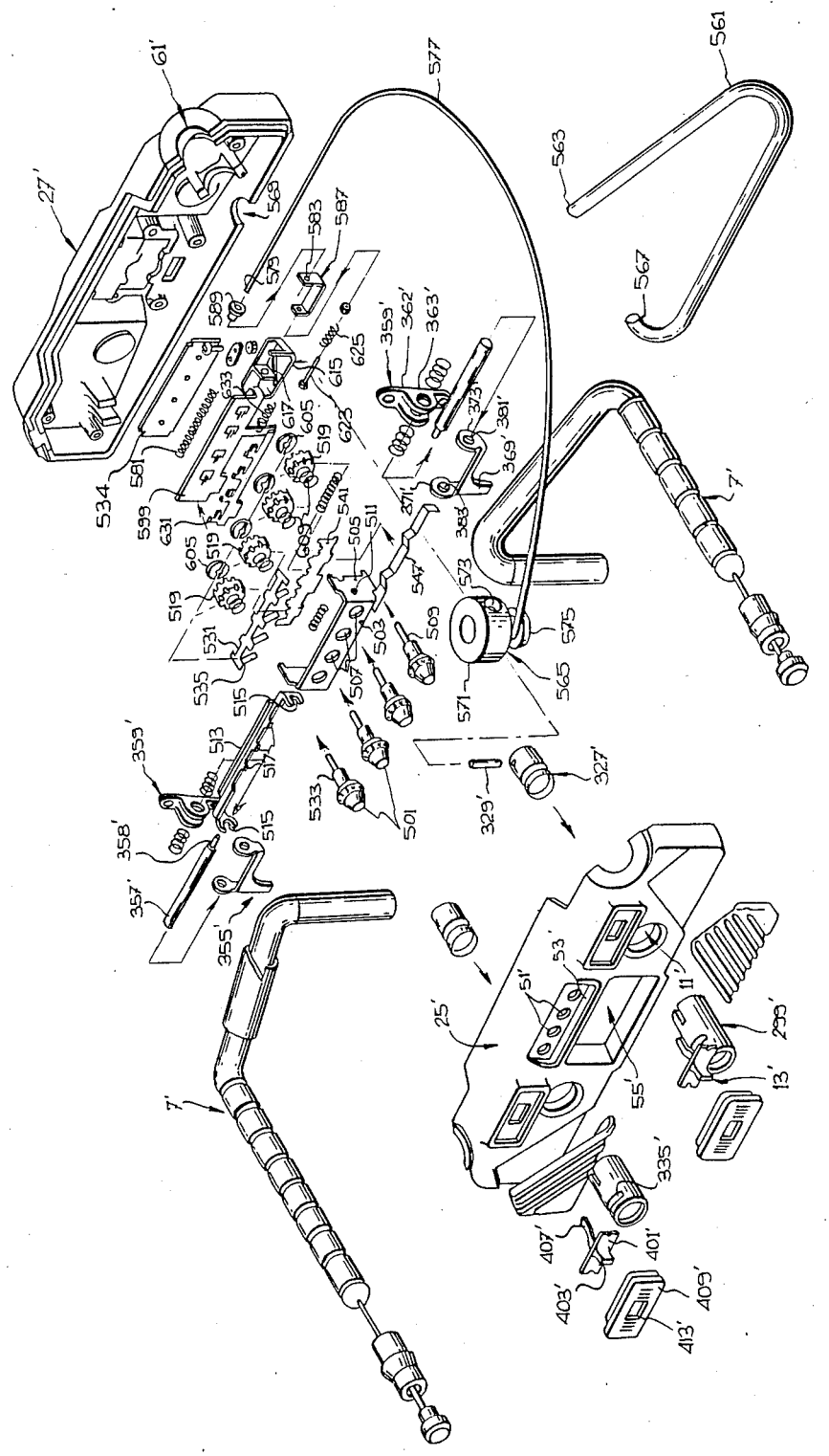
FIG. 30 is an exploded, perspective view of the locking fixture shown in FIGS. 28 and 29, incorporating a reset mechanism.
Figure 31:
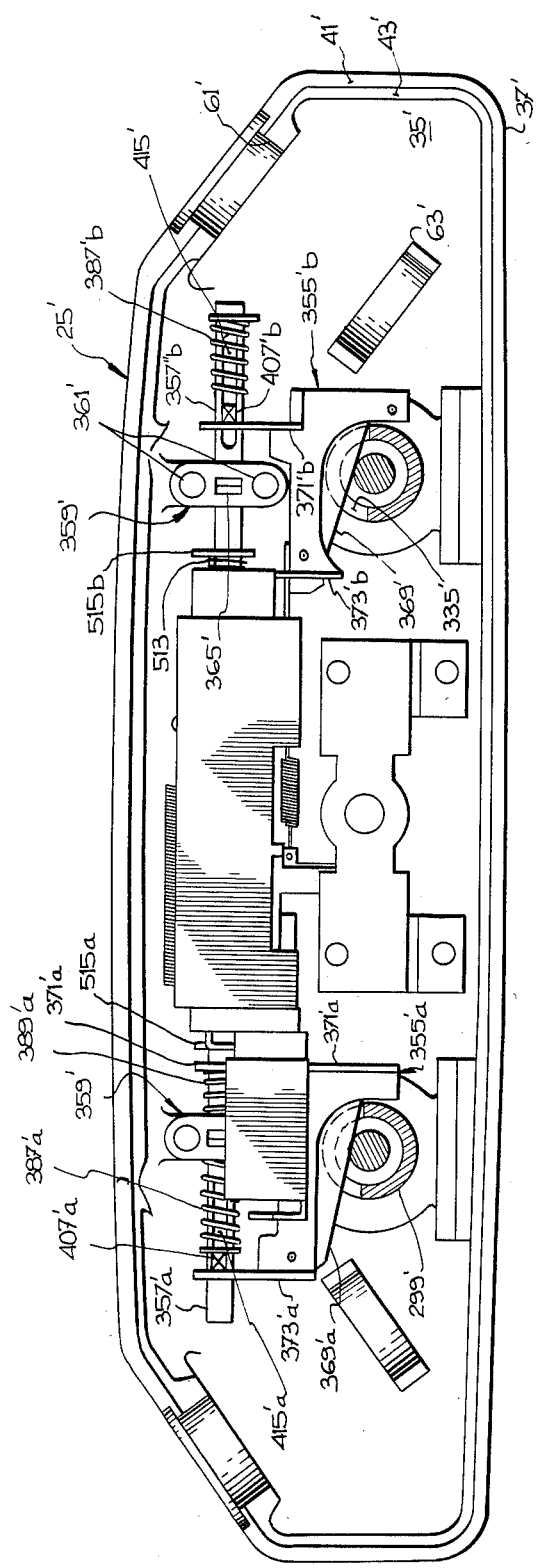
FIG. 31 is a rear elevational view of the front housing of the embodiment shown in FIG. 28.
Figure 32:
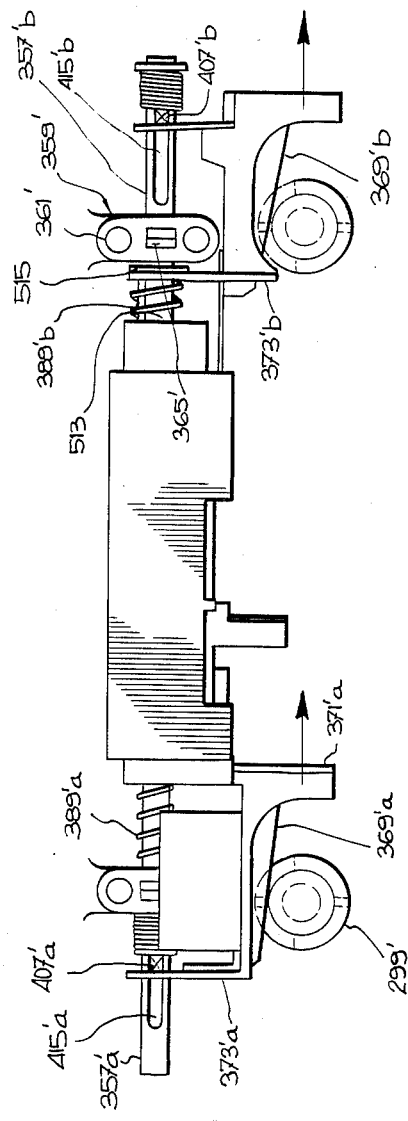
FIG. 32 is a view similar to FIG. 31, showing the latch means only in a different position.

As shown in FIGS. 30 to 32, the latch means of the locking fixture 1' includes a pair of sliding latch plate 355'a 355'b each associated with a socket 299' and slidably mounted on a short carrying rod 357'a, 357'b. Each rod 357' extends horizontally above the socket 299' and is mounted at one end 358' to an ear 505 of a fixation plate 503 which is centrally attached (with screws) to the rear wall of the front housing 25'. As shown in FIG. 30, the fixation plate 503 is provided with a plurality of openings 507 to give room to the stems 509 of the knob 501 as will be described hereinafter.

The end 358' has a diameter smaller than the diameter of the rod in order to provide a stop and is snuggly receive into a hole 511 provided for this purpose in the adjacent ear 505.

Each rod 357'a, 357'b is also fixed to a pair of mounting bosses projecting from the back wall of the front housing by means of a rod-mounting plate 359' fixed to the bosses by a pair of screws 361'. Each plate 359' has ears 362' with holes 363' therein through which the rod 357' is mounted. A stop tab 365' on each plate 359' cooperates with a shoulder (not shown) provided in the rod to hold this rod against rotation and logitudinal movement.

The latch plate 355'a, 355'b has a flat section 369' and a pair of mounting arms 371', 373' each having an enlarged free end 377', 379' respectively with a hole 381; 383' through each end, by means of which the latch plate 355' is slidably mounted on the rod 357'. One mounting arm 371' is mounted on the rod 357' on one side of the mounting plate 359' and the other mounting arm 373' is mounted on the rod 357' on the other side of the mounting plate 359'.

Both latch plates 355' are substantially identical in shape and size. They are mounted on their respective rods in such a manner as to move together in the same direction in order to simultaneously lock or unlock the free ends of the locking members 7'. Each latch section 369' permanently engages and is guided by a locking slot 335' provided on top of the corresponding socket 299'. Locking of the free ends of the locking members 7' is achieved when the latch plates 35' are laterally slid through the slots 335' to such an extent that the plate sections 369' also engage the locking slots 231' provided at the free ends of the locking members after the same have been inserted into the socket (see FIG. 3).

A first biasing spring 387'a is mounted between the arm 373'a of the latch plate 355'a (the one on left of FIGS. 31 and 32) and the corresponding mounting plate 359'. Another first biasing spring 387'b is mounted between the arm 371'b of the other latch plate (the one on right of FIGS. 31 and 32) and the free end of the corresponding rod. 357'. These two springs 387'a and 387'b are so mounted as to permanently bias their respective latch plates 355' into the slots 335' of the sockets 299' (see FIG. 31).

A second biasing spring 389'a weaker than the spring 387'a is mounted between the mounting plate 359' and the arm 371' of the one latch plate 355'a. Another second biasing spring 389'b weaker than the spring 387'b is mounted between the adjacent ear 505 of the fixation plate 503 and the arm 373'b of the other latch plate 355'b (see FIG. 32).

The latch operators 13' on the housing 3' operate the latch plates 355' to receive the free ends 9' of the locking members 7'. The actuating finger 407'a, 407'b of each operator 13' extends into a slot 415' extending longitudinally into the corresponding carrying rod 357'. The finger 407'a extends in its slot 415'a between the arm 373'a of the latch plate and the biasing spring 387'a. The finger 407'b extends into its slot 415'b between the arm 371'b of the other latch plate and the biasing spring 387'b.

When the latch means are assembled within the housing 3' along with the latch operators 13', the springs 387'a and 387'b bias the actuating fingers 407' laterally against the action of the weaker second springs 389'a, 389'b.

The edge of each latch plate 355' fits into the locking slot 339' of the closure plug 327' after passing through the locking slot 335' of the socket 299'. The socket opening 11' is thus normally closed by the plug 327'. When the free end of a locking member 7' must be inserted into one opening 11', the tab 403' of the corresponding operator 13' is manually moved to compress the first spring 387'a or 387'b with the actuating finger 407'. This allows the second weaker spring 389'a or 389'b to move the latch plate 355' outwardly of the socket 299' to release the plug 327'. The free end 9' of the locking member 7' may then be pushed inwardly into the socket 229'. The tab 403' of the operator 13' may then be released. As soon as the locking slot 231' formed at the free end of locking member 7' passes the edge of the latch plate 355', the first spring 387'a or 387'b moves back the latch plate to enter the slot 231' and hold the end 9' within the housing 3'.

The lock means used to prevent unauthorized movement of the latch plates 355' once the free ends 9' of the locking members 7' are held in place with the housing, includes a locking bar 513 having slotted ears 515a, 515b at both ends. The bar 513 has such a length that its one ear 515a rides the carrying rod 357'a between the arm 371'a of the one latch plate 355'a and the adjacent ear 505 of the fixation plate 503, and its other ear 515b rides the carrying rod 357'b between the arm 373'b of the other latch plate 355'b and the adjacent rod-mounting plate 359' (see FIG. 31). The purpose of the locking bar 513 is to prevent the latch plates 355'a, 355'b from being moved by the weaker springs 389'a, 389'b to unlatch the free ends of the locking members 7' when the tabs of the operators 13 are manually moved, until the "correct" combination of numbers is dialed with the knobs 501. This bar 513 comprises a number of locking pins 517 that are equally spaced apart along its length and integrally project from one of its edges.

When the lock means are assembled, each pin 517 extends adjacent the periphery of a locking disc 519 mounted on the stem 509 of each knob 501 (see FIGS. 33, 34, 38 and 39). Each locking disc 519 is formed with a slot 521 which is sized and oriented in such manner as to give room to the pin 517 when the correct number of the combination is dialed with the corresponding knob 501. When the correct combination of numbers is dialed with all of the knobs 501, the slots 521 of all the discs 519 are aligned and positioned in front of the pins 517 thereby making the locking bar 513 free to move laterally under the action of the operators 13' and weaker springs 389'a, 389'b. If, however, the slots 521 of one or more discs 519 are misaligned, the peripherical surface of these discs 519 stops the adjacent pins 517 and thus prevents the locking bar 513 and the latch plates 355'a, 355'b retained by said bar from moving to unlatch the free ends of the locking members 7'.

As better shown in FIGS. 30, 36 and 37, the stems 509 of the knobs 501 pass through a set of holes 51' provided in the recessed portion 53' of the front wall 25' of the housing. Each hole 51' is externally stepped at 523 in order to receive at least in part the head 525 the knob 501 and prevent the same from being tampered. Each knob 501 is held in position in its corresponding hole 51' by its head 525 biasing on the external step 523 of the hole on one side of the housing wall 25' and by a clip 527 inserted into a peripherical groove 529 provided in an enlarged portion 533 of the stem 509 adjacent the other side of the housing wall 25'.

It is worth mentioning that when the stems 509 are inserted in the holes 51' and fixed with the clips 527, their free ends inside the housing are engaged and held in holes provided in a holding plate 534 rearwardly fixed into the housing 3'.

Figure 33:
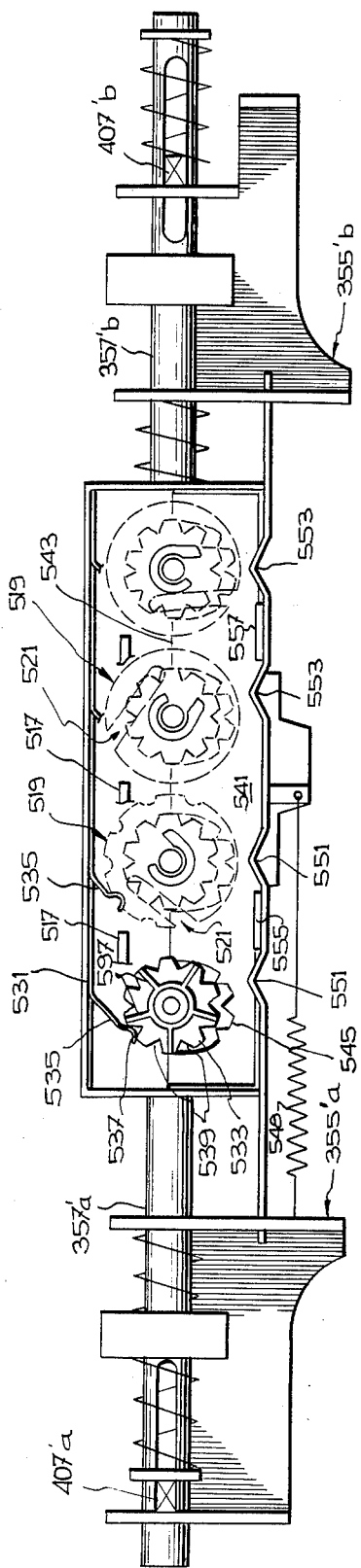
FIG. 33 is a rear elevational view of a blocking mechanism for use to prevent the combination knobs of the lock shown in FIG. 28 from being rotated when the latch means are actuated.
Figure 34:
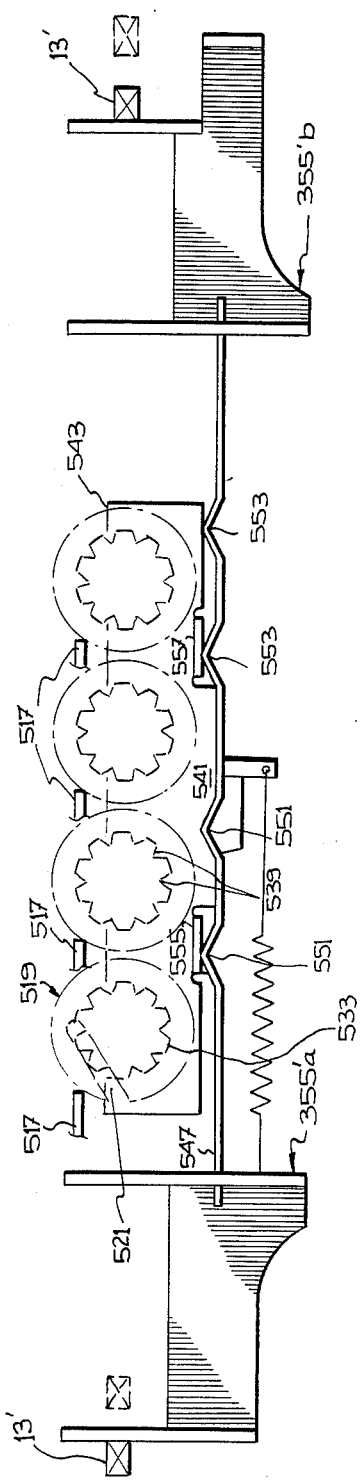
FIG. 34 is a view similar to FIG. 33, showing the blocking mechanism in blocking position.
Figure 35:
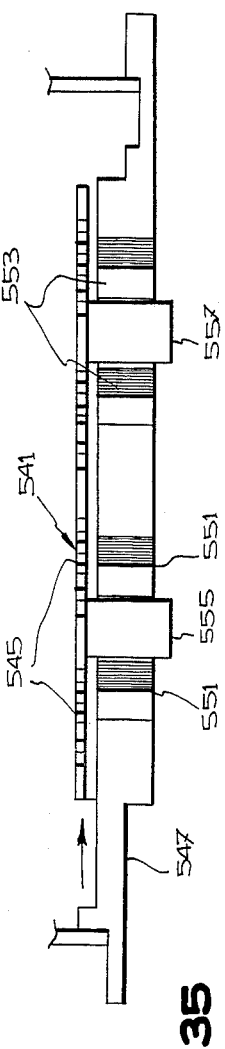
FIG. 35 is a top plan view of the blocking mechanism shown in FIG. 33.
Figure 40:
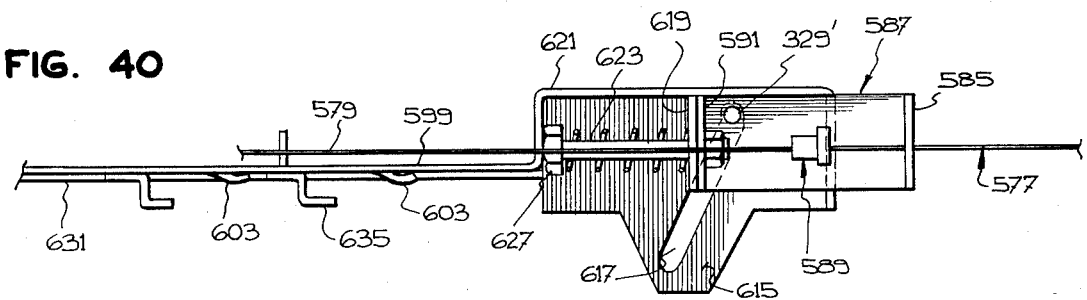
FIG. 40 is a top plan view of the lock mechanism of the locking fixture of FIG. 28.
Figure 41:
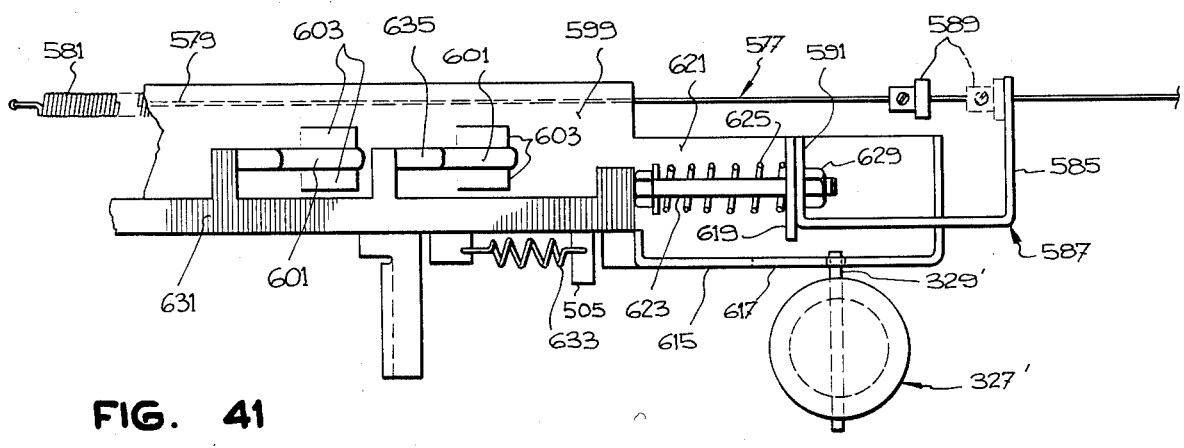
FIGS. 41 and 42 are front elevational view of the lock mechanism shown in FIG. 40 in locking and unlocking positions, respectively.
Figure 42:
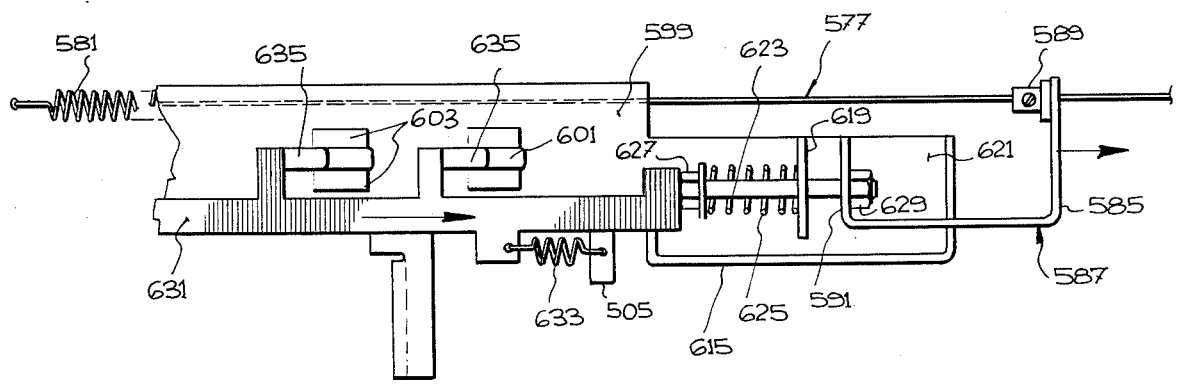

To avoid any misalignment of the knobs 501 when dialing a number, pawl means may be provided for allowing step-by-step rotation of each knob, each step corresponding of course to a dialing number. As shown in FIGS. 30, 33 and 34, such pawl means comprises a plate 531 extending between both ears 505 of the fixation plate 503 above the enlarged portions 533 of the stems 509 adjacent the housing wall 25'. The pawl means also comprises a set of axial corrugations 539 provided all around the peripherical surface of the stem portion 533 of each knob 501, each corrugation 539 corresponding to a position of the knob 501 which itself corresponds to a dialing number. A set of flexible blades 535 extend at angle from the plate 531 and bear against the peripherical surfaces of the knobs 501. Each blade 535 is provided with a small bead 537 adjacent its free end. Due to the flexibility of the blades 535, the small beads 537 "jumps" from one corrugation 539 to the other when the knobs 501 are rotated, and thus provide step-by-step adjustment of these knobs 501 to dial the correct combination number.

To prevent an unauthorized user from finding the correct combination number by rotation of the knobs and simultaneous actuation of the operator 13' in order to press the pins 517 of the locking bar 513 against the peripherical surfaces of the discs 519 and thus "feel" the small rotational discrepancies that occur when the pins 517 reach the slots 521, means are provided to block the knobs 501 and thus prevent their rotation as soon as one or both operators 13' are actuated. These means consist of a vertical plate 541 slidably mounted against the fixture plate 503, between the ears 505 there of and under the corrugated portions 533 of the knobs 501. The upper edge 543 of the plate 541 (see FIGS. 33 to 35) comprises a set of recesses 545 positioned and sized to snuggly engage the bottom portions of the stem portions 533 of all the knobs 501 when the plate 541 is moved upwards. The bottom edge of each recess 545 is provided with teeth positioned and sized to engage the corrugations 539 of the stem portion 533. As shown in FIG. 34, mere lifting of the plate 541 from a lower portion (shown in FIG. 33) up to an upper position (shown in FIG. 34) causes the teeth of the recesses 545 to engage the corrugations 539 of the stem portions 533 of the knobs 501 and thus prevent rotation of these knobs. Such a lifting is achieved by means of an actuating member 547 operatively connected to the latch plates 355'a, 355'b respectively. The member 547 which extends horizontally between the latch plates 355'a and 355'b, is shaped to form a double set of cams 551, 553. As shown in FIG. 33, the cams 551 of one set extend on both sides of a small horizontal tab 555 integrally projecting from the lower edge of the plate 541 whereas the cams 553 of the other set extend on both sides of another small horizontal tab 557 integrally projecting from the lower edge of the plate 541. Actuation of any latch plate 355'a, 355'b by means of its operator 13' (see FIG. 34) causes the member 547 to slide in the direction shown with an arrow in FIG. 35 against the action of a return spring 548 (see FIG. 33). This in turn causes one of the cams 551 and one of the cams 553 to engage the tabs 555 and 557 and causes the plate 541 to slide up and "lock" the knobs 501 (see FIG. 34). As a result, it becomes impossible to rotate the knobs while actuating the operators 13' and thus to "feel" the correct combination number. Of course, the member 547 comes back to inoperative position as soon as the operators 13' are released, due to the action of the return spring 548 connected thereto.

Provided that the locking discs 519 are rigidly fixed to the stems 509 of the knobs 501, the locking fixture 1' described hereinabove can be used by a single person exclusively who is aware of the correct combination.

In numerous applications such as, for example, in public areas where a great number of different persons may need park and lock their motor- or bicycle for a short period of time, it is however necessary to provide a reset mechanism into every fixture, to make it possible for every user to substitute a new combination of numbers for any previous one prior to parking his or her vehicle.

Figure 43:
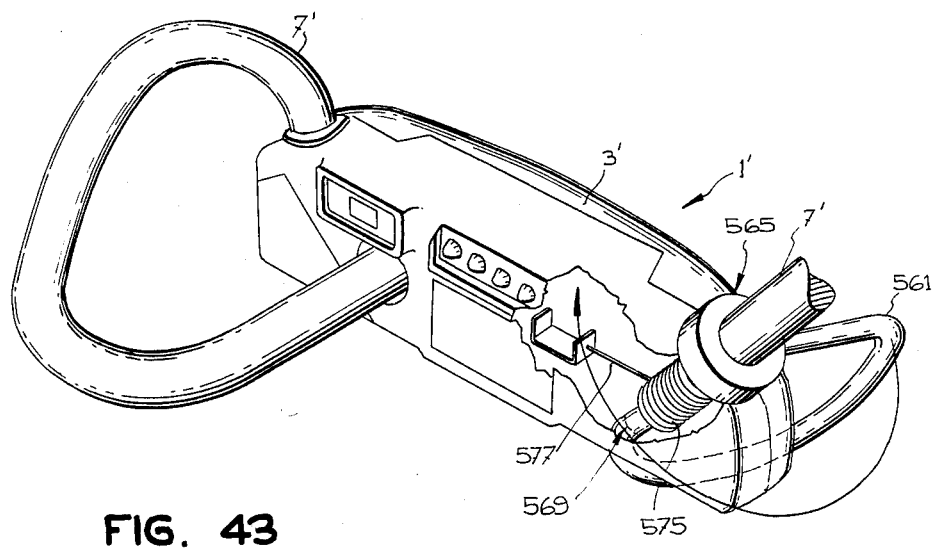
FIG. 43 is a perspective view of the locking fixture shown in FIG. 30, showing the reset and its rotational motion.
Figure 44:
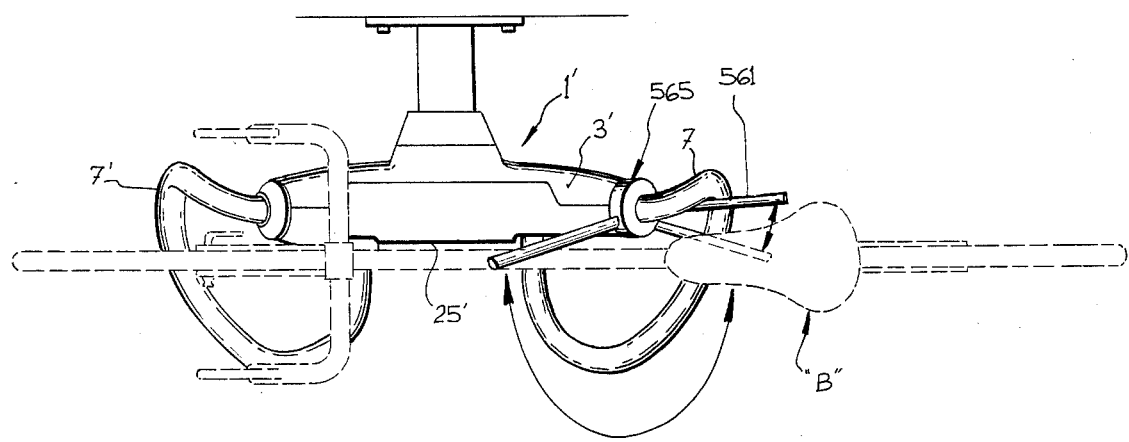
FIG. 44 is a top plan view of the locking fixture shown in FIG. 43, showing how a locked bicycle may prevent rotational motion of the reset member.

The reset mechanism as shown in FIGS. 30, 43 and 44, comprises a large V-shaped arm 561 operatively connected to a clutch mechanism whose purpose is to "unlock" the locking discs 519 from the stems of the knobs 501 in order to allow the next user of the fixture 1' to rotate the knobs relative to the discs prior to locking his or her cycle and thus dial another combination number of his or her own, that will remain set when the clutch mechanism is released. The arm 561 has one end 563 fixed to the outer portion of a plug-shaped collar 565 rotatably mounted into one of the mounting opening 61' on top of the housing 3'. The arm 561 has its other end 567 which is inwardly bent and freely mounted into a through hole 569 provided in the bottom of the housing 3', in alignment with the hole 61'.

The plug-shaped collar 565 acts as mounting means for one of the locking member 7', in lieu of the first mounting collar 241 and metal cover 297 shown in FIG. 11. It comprises an annular body made of metal and having a large cylindrical outer portion 571 provided with a radial blind hole 573 in which is inserted the end 563 of the arm 561. The collar 565 also comprises an annular flange (not shown) positioned under the outer portion 571 to form together with the bottom surface of said outer portion 571, a pair of annular flanges whose purpose is similar to the flanges 245, 247 shown in FIG. 11, namely to securely mount the collar in the hole 61'. The collar 565 finally comprises an inner portion 575 shaped as a spool, on which winds an actuating cable 577 as will be described hereinafter.

As shown with "arrows" in FIGS. 43 and 44, the arm 561 is large enough to be rotated about an inclined axis passing through the opening 61' and hole 569', all around the lateral side and the adjacent corners of the housing 3'.

When no bicycle "B" is parked against and/or locked to the fixture 1', the arm 561 may be rotated at more than 200° from a rearward, "inactive" position to a forward resetting position where the apex of the arm is very close to the front wall of the front housing part 25 (see FIG. 44). However, when a cycle is parked and/or locked, the same rotation of the arm 561 from its rearward position is impedded by the frame of the cycle "B" and restricted to an angle of about 60°. Due to this rotational restriction which prevents the arm 561 to reach its forward resetting position, it becomes impossible for anybody to tamper with the combination number dialed by the owner of a bicycle being locked. Indeed, because of the above arm 561, reset of the lock means, actuation of the latch means to unlock the locking member 7' and alteration of the combination can only be done if no bicycle is parked.

The cable 577 which is wound around the spool-shaped portion 575 of the collar 565, has one end fixed to this portion 575 and another end 579 fixed to a return spring 581 attached to the inner wall of the housing 3' (see FIGS. 30 and 40 to 42). When the arm 561 is rotated forwards, the cable 577 winds around the spool-shaped portion 575 of the collar 565 against the action of the spring 581. Of course, when the arm 561 is moved backwards, the return-spring 581 pulls back the cable 577 and causes the same to unwind.

The cable 577 inside the housing, passes through a small hole 583 provided in the longest arm 585 of a dissymmetric U-shaped member 587. A stop 589 bigger than the hole 583 is rigidly fixed onto the cable 577 between the arm 585 and the return-spring 581. The stop 585 is positioned to be at a short distance away from the arm 585 when the actuating arm 561 is in backward position (see the plain lines in FIGS. 40 and 41). When the arm 561 is rotated forwards, the cable 577 slides freely in the hole 583 until the stop 589 contacts the arm 585. Then, the cable 577 starts pulling the member 587 (see FIG. 42) to achieve the requested reset as will be described.

The travel of the stop 589 before it contacts the arm 585 of the member 587, is advantageously "calculated" to correspond to a rotation of about 70° to 100° of the arm 561. As a result, only a full rotation of the arm 561 (i.e. a rotation not restricted by the presence of an already parked bicycle) will allow the member 587 to be pulled and the lock means to be reset.

To allow free rotation of the knobs 501 with respect to their locking discs 519 and thus allow selection of any desired combination of numbers, the discs 519 are freely mounted onto the stems 509 and are each provided on one face 593 with a set of radial teeth 595 that can mesh with a set of corresponding teeth 597 provided on the adjacent surface of the enlarged portion 533 of the stem 509 (see FIGS. 33, 36 and 37).

Cam means are provided to keep the discs 519 permanently meshed with the knobs 501 unless the reset mechanism is actuated. These cam means comprises a small plate 599 slidably mounted against the stem holding plate 534. The plate 599 is provided with a set of longitudinal slots 601 to give room to the stems 509. Each slot 601 has its upper and lower edges 603 externally punched out at angle to cam the adjacent disc 519 in intermeshing relationship with its knob 501 when the plate 599 is in its "camming" position (FIG. 37). As shown in FIGS. 36 and 37, such a camming is achieved by symmetrical engagement of the camming portions of the edges 603 on the external, rounded surface of a small cap 605 mounted at the end of a radially slotted drum 607 integrally projecting from the surface of the dics 517 opposite to the toothed surface 593, coaxially with the stem 509.

A compression spring 609 is mounted onto the stem 509 between the portion 533 of this stem and the disc 519 to push the same away and cause disengagement of the teeth 595 and 597 as soon as the plate 599 is lateraly slid from its camming position to its uncamming position where the cap 605 disengages the camming portions of the edges 603 (FIG. 36). To maintain a proper alignment of the disc 519 along the stem 509, the spring 609 is advantageously mounted into a cylindrical cavity which centrally entends in the disc from the surface 593 thereof, and in which is telescopically mounted a guiding tube 613 integrally extending the enlarged portion 533 of the knob 501.

The camming plate 599 is mechanically connected to and operated (i.e. slid from its camming to its uncamming position and vice versa) by one of the closure plug 327' slidably mounted inside one of the socket 299'. To achieve such a mechanical connection and operation, one end of the plate 599 is rigidly connected to a small horizontal plate 615 extending above the slotted end of the socket 299'. A slot 617 of given length extends at angle across the small plate 615. The slot 617 snuggly receives the upper end of the guide pin 329' of the plug 327' as clearly shown in FIGS. 40 and 41. As a result of this interconnection of the pin 329' inside the angularly oriented slot 617', any movement of the plug 329' inside the socket 299' causes the camming plate 599 to move in translation in a perpendicular direction, i.e. to slide against the stem holding plate 534.

The relative orientation of the slot 617 with respect to the selected socket 299' and the orientation of the camming portions of the edges 603 of the slots 601 of the plate 599, are advantageously selected so that any backward movement of the plug 327' against its biasing spring 331' inside the socket 299', which movement is automatically achieved when a locking member 7' is inserted into the socket 327', causes the plate 599 to slide from its uncamming to its camming position. However, any forward movement of the plug 327' on the action of the biasing spring 331', which movement is achieved as soon as the locking member 7' is removed from the socket 327' and the plug 327' is left free to move, will cause the plate 599 to move back from its camming to its uncamming position where the discs 519 may freely rotate about the stems 509 of the knobs 501.

The camming plate 599 is also mechanically connected to and operated (i.e. slid) by the actuating cable 577, via the U-shaped member 587. The purpose of this "additional" connection is to prevent someone from permanently appropriating the locking fixture 1' by merely reinserting the ends of the locking members 7' inside the socket 299' after his or her cycle is unlocked and removed from the stand, and then jamming again the combination. Indeed, in such a case, it would be impossible for any subsequent person to unlock the locking member 7' and use the fixture 1' unless he or she knows the correct combination.

To avoid such a misuse of the fixture 1' and allow anyone to unlock the same if it is unoccupied, the camming plate 599 is thus designed to be pulled by the cable 577 by means of a full rotation of the arm 561, from its camming to its uncamming position where the latch plates are freed and the combination number is resettable.

As aforesaid, the plate 599 is connected to the cable 577 via the U-shaped member 587. For this purpose, the shortest arm 591 of the member 587 is connected to a small plate 619 rigidly connected to another plate 621 extending rearwardly at 90° above the slotted plate 615 (see FIGS. 40 to 42). The connection between the arm 591 and plate 619 is not rigid. It is obtained by means of a compression spring 625 mounted onto a small bolt 625 between a nut 627 fixed at one end of this bolt and the plate 619, the bolt 625 being freely mounted through holes provided in the arm 591 and plate 619 and held in place by means of another nut 629 fixed at the other end of the bolt 625, opposite the arm 591.

It is worth mentioning that the small casing defined by the plates 615, 619 and 621 acts as a guide support for the U-shaped member 587.

It is also worth reminding that sliding of the plate 599 from its camming to its uncamming position by actuation of the arm 561 can only be achieved if the arm 561 is sufficiently rotated to allow the stop 589 to engage the longest arm 585 of the member 587. Therefore, release of the locking members 7' and reset of the combination can only be achieved if no cycle is already parked.

When the plate 599 is slid to its uncamming position, the knobs 501 may be freely rotated with respect to the discs 519. As a result, any new combination of number may be selected, which will become the "correct" combination as soon as the discs are cammed again in intermeshing relationship with the knobs 501. Of course, such a selection can only be done if the slots 521 in the disc 519 are operatively aligned with the pins 517 of the locking bar 513. To achieve this particular requirement, i.e. maintain the alignment of the slots 521 of the discs 519 with respect to the pins 517 when the knobs 501 are freely rotated to dial a new selected combination, a positioning bar 631 is provided.

The bar 631 is slidably mounted against the camming plate 599 and provided with positioned teeth 635 positioned and shaped to engage the slots 637 of the slotted drum 607 integrally projecting from the rear surface of the disc 637 (see FIGS. 38 and 39). The bar 631 is permanently biased towards the slots 637 by a spring 633 fixed to the ear 505 (see FIGS. 41 and 42). The bar 631 is however retained in inoperative position against the action of its spring 633 by the spring loaded bolt 623 whose nut 627 bears against one end of the bar 631.

As soon as the camming plate 599 moves from its camming to its uncamming position by either one of the plug 327' and cable 577, the bolt 627 is moved and allows the positioning bar 631 to move in the same direction as the plate 599 (see FIG. 42) and to contact the periphery of the drums 607 until its teeth enter the slots 637 (see FIG. 38). When such an engagement is achieved, the uncammed discs 517 are held in position with their slots 521 aligned with the pins 521 of the locking bar 513. The knobs 501 may then be rotated to set a new combination of number.

As soon as the locking members 7' are inserted into the sockets 299', the plate 599 is moved back to its camming position (due to the rearward movement of the plug 327') together with the positioning bar 631 which is pushed back against the action of its biasing spring by its bolt 619. Then the discs 517 are pushed forward to mesh with the knobs 501 with all the slots 521 of said discs aligned with the locking pins 517. The new combination is then set and can be jammed by the user.

Although one single type of locking member 7,7' has been described hereinabove, it should be understood that other types of locking members like the one shown in FIG. 45 may be used in accordance with the invention.

Figure 45:
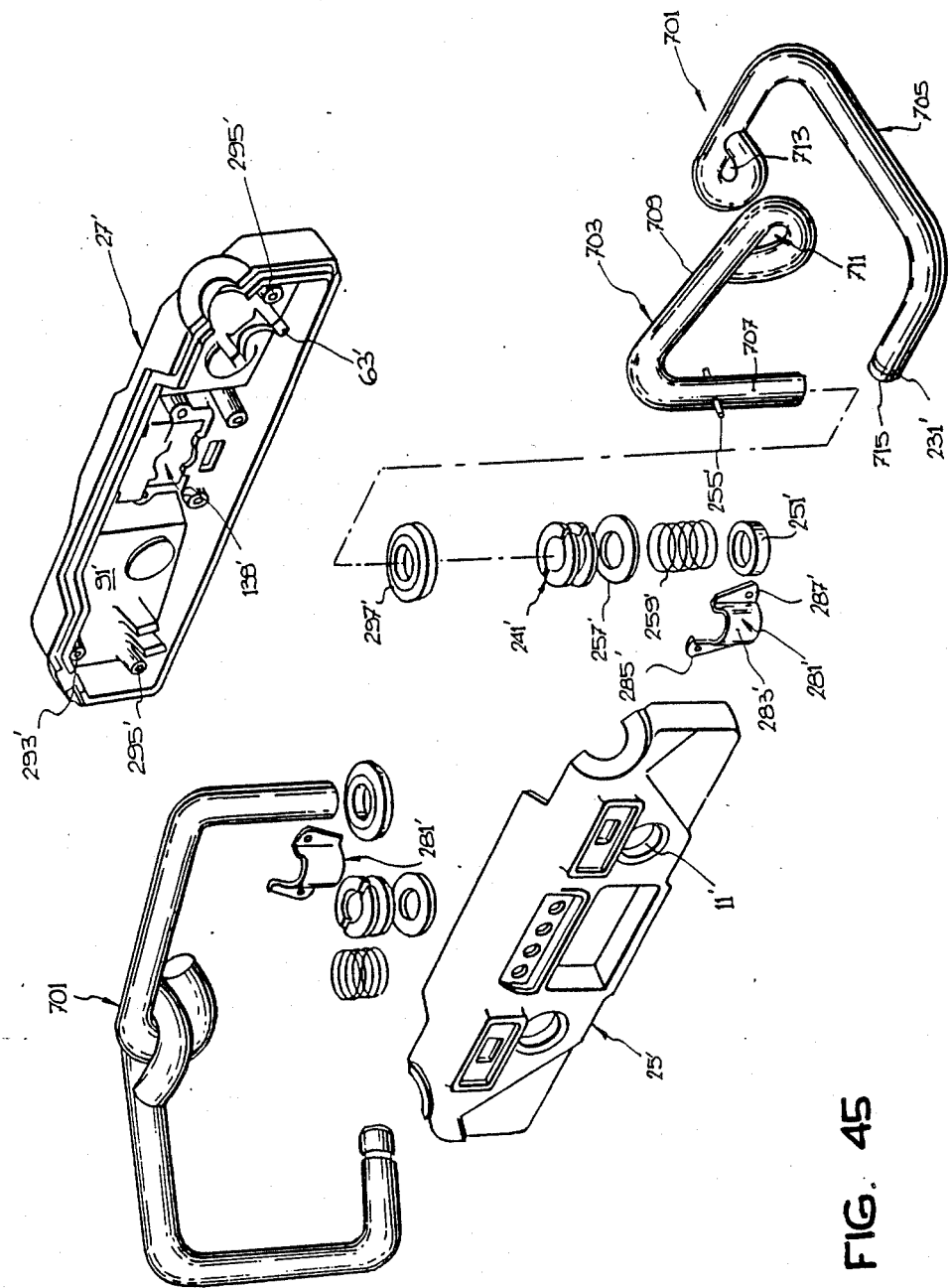
FIG. 45 is an exploded perspective view of a variant of the locking fixture shown in FIG. 28, making use of a different set of spring-loaded locking members and showing details of the mounting of this set on the rear housing.

In this FIG. 45, each locking member 701 consists of two articulated bars 703, 705.

One of these bars is used to mount the member to the housing. This mounting bar 703 has a straight inner section 707 intended to be mounted in the housing substantially in the same manner as the inner section 185A, 185A' of the locking members 7, 7' with a pair of mounting collars 241' and 251', a washer 257', a loading spring 259' and retaining pin 255'. If desired, a cover 281' can be provided to cover a portion of the spring 259'. The cover 281' has a semi-cylindrical portion 283, sized to cover the spring 259', and a mounting tab 285', 287' on each side. Fasteners (not shown) connect the cover to mounting bosses 293', 295' extending inwardly from the inner surface of the back wall 91' of the back housing 27'. The inner section 707 of the mounting bar 703 is extended at angle by a straight outer section 709 the outer end of which forms a loop 711.

The other bar 705 is used to lock the bicycle. This other bar 705 is U-shaped and has one end 713 shaped as a loop to engage the loop 711 and forms therewith an articulation imparting sufficient flexibility to the member 701 to pass it through the frame and a wheel of a bicycle and have its free end 715 provided with a slot 231' engaged into the corresponding opening 11' of the housing.

It may be appreciated that the structure of the locking members 701 is much simpler and therefore much cheaper to though less "flexible" than the structure of the members 7,7'.

What is claimed is:

1. A locking fixture for use in locking a two wheeled vehicle, said fixture comprising:
    a housing;
    means for mounting the housing at a fixed location;
    at least one elongated, flexible locking member extending outside of the housing, said locking member being capable of being looped about a portion of the vehicle to be locked to said fixture;
    means permanently fastening one end of said at least one locking member within the housing;
    at least one opening in the housing to selectively receive the other end of said at least one locking member;
    latch means within the housing for holding the other end of said at least one locking member within the housing when it is inserted into the housing through the opening;
    lock means operable from outside of the housing for locking the latch means to prevent withdrawal of the other end of said at least one locking member from the housing; and
    operator means mounted in the housing, operable from outside of said housing and mechanically connected to the latch means for manually moving said latch means between its holding and non-holding positions when the latch means is unlocked.
    wherein said operator means are mechanically connected to the latch means through resilient means giving a slack to the connection, in order to prevent said operator means from being used to tamper with said latch means.

2. A locking fixture as claimed in claim 1 wherein the housing comprises a front housing part, a rear housing part, first fastening means within the housing for connecting the front and rear housing parts together, and cover means lockable to the housing to normally conceal the first fastening means.

3. A locking fixture as claimed in claim 2 wherein the housing further includes means on the front and rear housing parts to interlock them together to prevent relative rotation between the housing parts.

4. A locking fixture as claimed in claim 3, wherein the housing further comprises a cap member, said cap member and the rear housing part combining to form a base socket to receive the end of a stand to which the fixture is to be mounted, and second fastening means within the housing for connecting the cap member to the housing and the housing to the stand, with said cover means concealing said second fastening means.

5. A locking fixture as claimed in claim 1 wherein
    the one end of the locking member comprises a straight end portion of a rigid bar,
    means are provided in the housing for rotatably mounting the end portion of said rigid bar in the housing and
    means are provided for the preventing withdrawal of said end portion from the housing.

6. A locking fixture as claimed in claim 5 further comprising spring means for rotatably biasing the end portion of said rigid bar about its longitudinal axis to a first position, and stop means for limiting rotational movement of said end portion about its longitudinal axis to a second position.

7. A locking fixture as claimed in claim 1, wherein:
    each opening provided in the housing for receiving the other end of each of said at least one locking member is in direct communication with a coaxial socket integral to the housing, said socket being sized to snugly fit around the other end of said at least one locking member;
    the other end of each of said at least one locking member is provided with slot means extending transverse to the longitudinal axis of said at least one locking member; and
    said latch means comprises a latch plate per opening and socket, means for slidably mounting each latch plate in the housing for movement in a direction transverse to the longitudinal axis of the socket, said mounting means comprising a mounting rod fixedly mounted in the housing, and slot means in the wall of the socket for allowing an edge of the latch plate to enter both of said the socket and slot means at the other end of said at least one locking member when said other end is inserted into the socket and the latch plate is slid toward the socket, in order to prevent withdrawal of the locking member from said socket.

8. A locking fixture as claimed in claim 7 wherein said latch means further comprise spring means for biasing the latch plate toward the socket.

9. A fixture as claimed in claim 8 further comprising:
    a closure member slidably mounted in the socket; and
    means to biasing the closure member inside said socket to normally close the same.

10. A locking fixture as claimed in claim 7, wherein said locking means are of the combination type and comprise
    a set of dials rotatably mounted on the mounting rod of at least one latch plate, and
    a locking pin connected to said at least one latch plate and cooperating with said dials to selectively prevent sliding movement of said at least one latch plate until all of the dials are rotatably positioned into a predetermined position corresponding to a correct combination.

11. A locking fixture as claimed in claim 7, wherein said locking means are of the combination type and comprises:
    a set of knobs fixed to the housing,
    a corresponding set of slotted discs located inside the housing, each of said discs being associated to a knob; and
    a locking bar provided with a plurality of pins engageable into the slots of the discs when said slots are aligned therewith, said locking bar being mechanically connected to each latch plate to prevent any sliding movement of said latch plate until all of the discs are rotated by their respective knobs into a predetermined position where their slots are aligned with the pins of the locking bar, said predetermined position corresponding to a correct combination.

12. A locking fixture as claimed in claim 11, further comprising reset means for disconnecting the discs from their corresponding knobs, thereby allowing free rotation of the knobs with respect to the discs in order to dial another combination prior to parking and locking a vehicle.

13. A locking fixture as claimed in claim 12, wherein said reset means comprises an actuating arm externally fixed to the housing in such a manner as to be rotatable into an actuating position where reset is achieved, only if a vehicle is not locked.

14. A locking fixture as claimed in claim 12, further comprising means for preventing rotation of the knobs as soon as the operator means are actuated.

* * * * *